United States Patent [19]
Ishii et al.

[11] Patent Number: 6,052,159
[45] Date of Patent: Apr. 18, 2000

[54] IMAGE SIGNAL REPRODUCING APPARATUS HAVING MEANS FOR CONCEALING IMAGE SIGNALS

[75] Inventors: Yoshiki Ishii, Yokohama; Makoto Shimokoriyama, Kawasaki; Akio Fujii, Yokohama, all of Japan

[73] Assignee: Canon Kabushiki Kaisha, Tokyo, Japan

[21] Appl. No.: 08/876,598

[22] Filed: Jun. 16, 1997

Related U.S. Application Data

[63] Continuation of application No. 08/733,720, Oct. 16, 1996, abandoned, which is a continuation of application No. 08/165,838, Dec. 14, 1993, abandoned.

[30] Foreign Application Priority Data

Dec. 24, 1992 [JP] Japan .................................. 4-357633
Jan. 14, 1993 [JP] Japan .................................. 5-005388

[51] Int. Cl.[7] .................................................. H04N 7/12
[52] U.S. Cl. ......................... 348/845.1; 348/420; 358/431
[58] Field of Search .................................. 358/431–433, 358/447, 463; 348/246–247, 845.1, 420; 382/275, 254, 236, 239

[56] References Cited

U.S. PATENT DOCUMENTS

| | | | |
|---|---|---|---|
| 4,253,120 | 2/1981 | Levine .................................. | 348/246 |
| 4,807,033 | 2/1989 | Keesen et al. .......................... | 358/167 |
| 4,833,723 | 5/1989 | Massmann et al. ..................... | 382/275 |
| 4,858,013 | 8/1989 | Matsuda ................................. | 348/247 |
| 4,903,138 | 2/1990 | Aragaki ................................. | 348/420 |
| 4,941,186 | 7/1990 | Massmann et al. ..................... | 382/275 |
| 5,150,210 | 9/1992 | Hoshi et al. ........................... | 358/135 |
| 5,165,072 | 11/1992 | Kurita et al. ......................... | 358/448 |
| 5,247,363 | 9/1993 | Sun et al. ............................. | 358/167 |
| 5,574,503 | 11/1996 | May ..................................... | 348/420 |
| 5,606,631 | 2/1997 | Weiss et al. ......................... | 382/275 |

FOREIGN PATENT DOCUMENTS

| | | |
|---|---|---|
| 0471580 | 2/1992 | European Pat. Off. . |
| 0551599 | 7/1993 | European Pat. Off. . |
| 0557684 | 9/1993 | European Pat. Off. . |
| 4305578 | 9/1993 | Germany . |
| WO8702210 | 4/1987 | WIPO . |

OTHER PUBLICATIONS

Electronics. DE 1984 A 1985: Electronics Week, vol. 63, No. 4, Apr. 1990, New York US p. 144, XP 115706, J Gosch 'Errors? No problem'.

Primary Examiner—Thomas D. Lee
Assistant Examiner—Stephen Brinich
Attorney, Agent, or Firm—Fitzpatrick, Cella, Harper & Scinto

[57] ABSTRACT

The present invention provides an image signal reproducing apparatus, in which code errors are concealed by using only pixel data corresponding to parts of the pixels of respective two or more adjacent blocks both of which are adjacent to a subject block to be concealed in the same frame, to conceal the code errors without disturbing the image even if the image is rapidly moving and all of pixels included in the block are not available.

32 Claims, 23 Drawing Sheets

FIG.18

|  | B | | | | | | | | |
|---|---|---|---|---|---|---|---|---|---|
|  | x(1,1) | x(2,1) | x(3,1) | x(4,1) | x(5,1) | x(6,1) | x(7,1) | x(8,1) | |
| ○ | ○ | ○ | ○ | ○ | ○ | ○ | ○ | ○ | ○ | y(1,1) ○    + s(1,1) + s(1,2) + s(1,3) +    +    +    +    +     ○ y(1,2)

y(2,1) ○    + s(2,1) + s(2,2) +    +    +    +    +    +     ○ y(2,2)

y(3,1) ○    + s(3,1) +    +    +    +    +    +    +     ○ y(3,2)

y(4,1) ○    +    +    +    +    +    +    +    +     ○ y(4,2)

D                              A                              E y(5,1) ○    +    +    +    +    +    +    +    +     ○ y(5,2)

y(6,1) ○    +    +    +    +    +    +    +    +     ○ y(6,2)

y(7,1) ○    +    +    +    +    +    +    +    +     ○ y(7,2)

y(8,1) ○    +    +    +    +    +    +    + s(8,7) + s(8,8)     ○ y(8,2)

|  | ○ | ○ | ○ | ○ | ○ | ○ | ○ | ○ | ○ |
|---|---|---|---|---|---|---|---|---|---|
| ○ | x(1,2) | x(2,2) | x(3,2) | x(4,2) | x(5,2) | x(6,2) | x(7,2) | x(8,2) | |

C

IMAGE SIGNAL REPRODUCING APPARATUS HAVING MEANS FOR CONCEALING IMAGE SIGNALS

This application is a continuation of application Ser. No. 08/733,720 filed Oct. 16, 1996, now abandoned, which is a continuation of application Ser. No. 08/165,838 filed Dec. 14, 1993, now abandoned.

FIELD OF THE INVENTION

This invention relates to an image signal reproducing apparatus, and particularly to an apparatus which reproduces a signal transmitted through a transmitting path, such as a magnetic or optical recording medium, or an artificial satellite, and conceals a portion of the that cannot be reproduced.

DESCRIPTION OF THE RELATED ART

An apparatus for recording and reproducing a digital image signal on and from a recording medium, e.g., a magnetic tape, is well-known. The fundamental constitution of the digital image signal recording and reproducing apparatus is briefly described as follows.

The apparatus converts an input analogue image signal to a digital image signal, or inputs a digital image signal. The digital image signal is encoded to compress an amount of data if necessary. The error correction codes are added to the encoded digital codes, and these codes are shuffled and are arranged in an order according to a predetermined recording format. The arranged codes are recorded on a magnetic recording medium.

In a reproducing mode, the apparatus reproduces the arranged codes from the medium and re-arranges the codes from the recording order in an original order. Errors which occur while recording or reproducing the codes are corrected by using the error correction codes. Errors which are impossible to correct are concealed by using data of pixels spatially or temporally adjacent to the pixel to be concealed. For example, such error data are replaced by data corresponding to an average value of pixels positioned in lines above and below the pixel to be concealed in the same frame or field, data of a pixel positioned at the same position in a previous frame, or data of an average value of pixels positioned at the same position in previous and subsequent frames.

Hereinafter, it is called an intra-frame interpolation to replace the erroneous data by using only reproduced pixel data being in the same frame, and it is called an inter-frame interpolation to replace the erroneous data by using reproduced pixel data being in other frames.

Generally, the intra-frame interpolation has a problem in that it degrades the image resolution, and the inter-frame interpolation has a problem in that it disturbs the image when the image is rapidly moving.

Coincidentally, a block-coding system is attracting notice as a high efficiency encoding method. The block-coding system groups a predetermined number of pixels to form a block. Orthogonal transformation, e.g., DCT (Discrete Cosine Transform), is carried out for each block as a unit, and transformed coefficients are quantized and encoded.

Such a block-coding system is known to achieve a high compression rate. However, if an error occurs which is impossible to correct, all of the reproduced pixel data in a whole block are not available and a two-dimensionally continuous area of pixels must be replaced. Accordingly, it is difficult to maintain the resolution of the image when using intra-frame interpolation.

Further, the block-coding system might use a variable length coding, and the variable length coding causes code errors to spread over a plurality of blocks. In such a case, it becomes more difficult to maintain the resolution of the image by using intra-frame interpolation. Therefore, inter-frame interpolation is generally used for interpolating the error codes, for example as shown in FIG. 1.

In FIG. 1, when the block X in the frame #n is impossible to reproduce, pixel data of the block X are replaced by reproduced pixel data of the block A located at the same position as the block X in the frame #(n−1).

However, as described above, the inter-frame interpolation is not appropriate for concealing erroneous codes which represent a rapidly moving image. Accordingly, some form of intra-frame interpolation which makes the degradation of the image inconspicuous is desired.

Also coincidentally, adaptive interpolation is known which changes adaptively between the intra-frame interpolation and the inter-frame interpolation according to the motion of the image. However, such an adaptive interpolation system requires provision of a motion detecting circuit which has a large amount of circuitry, and therefore the adaptive interpolation system makes the device large and expensive.

SUMMARY OF THE INVENTION

One of the objects with which the invention is concerned is to provide an image signal reproducing apparatus which is able to carry out an improved concealment of the erroneous codes.

One of the particular objects with which the invention is concerned is to provide an image signal reproducing apparatus which is able to conceal errors without disturbing the image even if the image is rapidly moving and all of pixels included in a block are not available.

Another particular object with which the invention is concerned is to provide an image signal reproducing apparatus which is able to carry out an adaptive concealment of errors without greatly increasing the amount of circuitry required.

Code errors are concealed, according to one aspect of the invention, by using pixel data corresponding to some of the pixels of two or more blocks which are adjacent to a subject block to be concealed and are in the same frame.

Code errors are concealed, according to another aspect of the invention, by replacing pixel data corresponding to at least some pixels of a subject block to be concealed with codes of a block which is adjacent to the subject block in the same frame.

Code errors are concealed, according to a yet further aspect of the invention, using pixel data of respective four blocks which are adjacent to a subject block to be concealed in all directions in the same frame.

A code error may be concealed, according to another aspect of the invention by selecting concealing pixel data from among concealing pixel data produced by a plurality of error concealing means, each of which is able to produce concealing pixel data to be used for concealing a given pixel, according to values of the concealing pixel data.

Other objects of the invention and other aspects of the invention will be apparent from the following description and drawings.

BRIEF DESCRIPTION OF THE DRAWINGS

FIG. 18 shows a model of blocks including a block to be concealed by the circuit shown in FIG. 17.

DETAILED DESCRIPTION OF THE PREFERRED EMBODIMENTS

Embodiments of the present invention will now be described by way of example only, with reference to the accompanying drawings.

Figure 2:
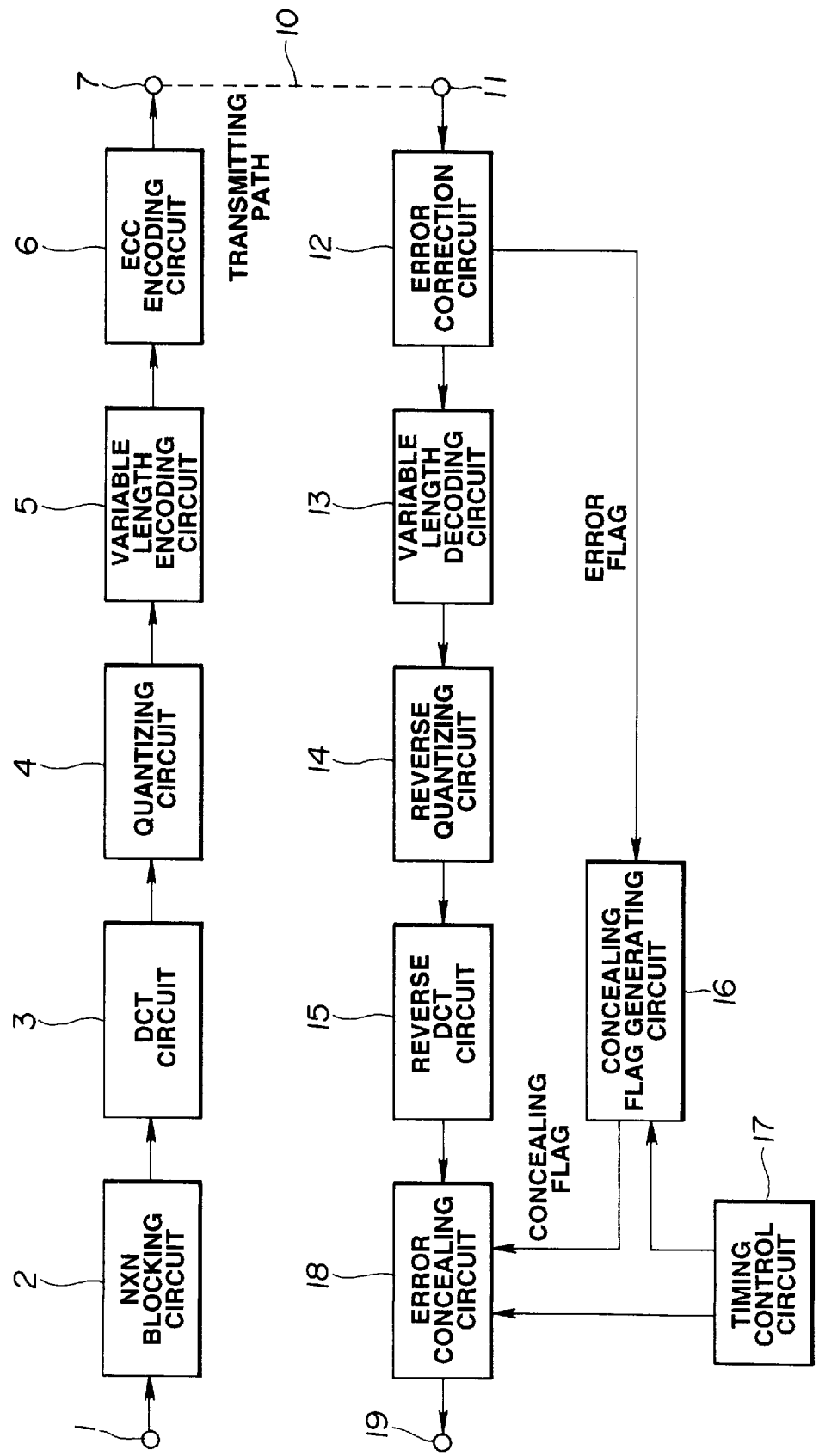
FIG. 2 is a block diagram which shows schematically an encoding and decoding apparatus concerned with first through fifth embodiments of the present invention.

FIG. 2 is a block diagram which shows schematically an image signal encoding and decoding apparatus concerned with first through fifth embodiments of the present invention.

In FIG. 2, a digitized image signal is input from an input terminal 1 and is supplied to an (N×N) blocking circuit 2.

Figure 3:
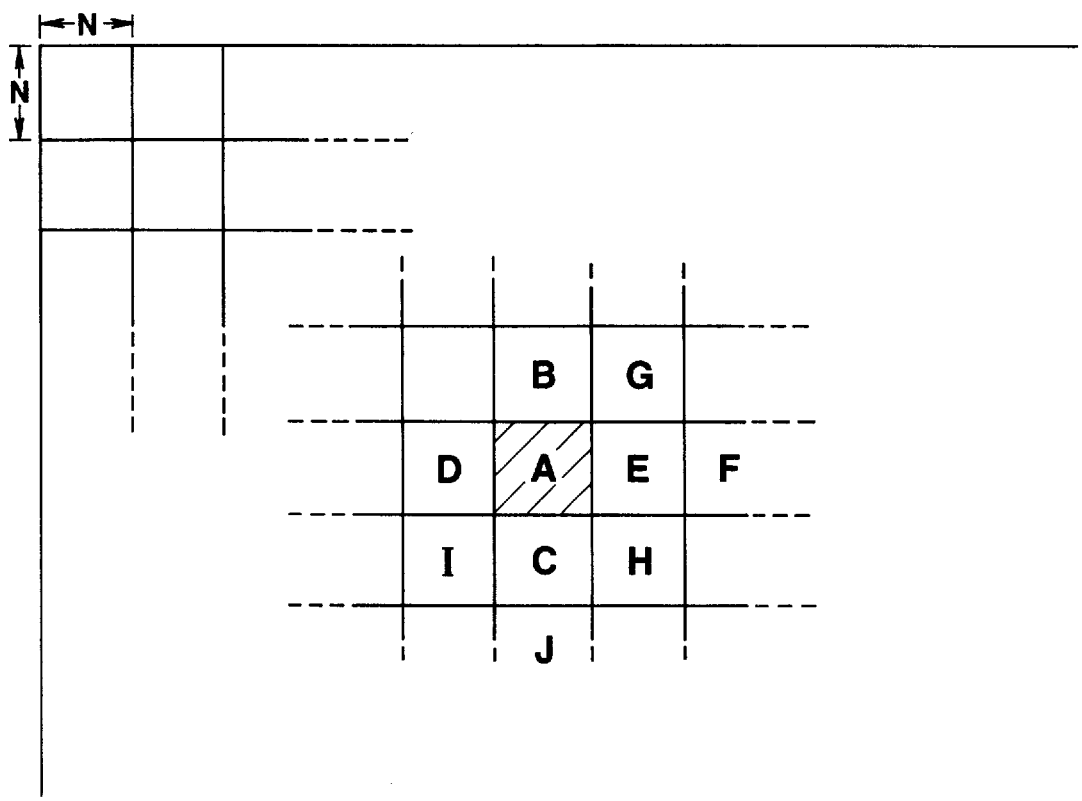
FIG. 3 shows a model for describing a method of dividing pixels into blocks.

The blocking circuit 2 divides all image data into blocks each of which is composed of data corresponding to a number (N times N) of pixels as shown in FIG. 3, N being an integer which is 2 or more, and rearranges the image data such that data forming the same block are output from the blocking circuit 2 as a unit. In FIG. 3, each of A, B, C, D, . . . J shows a block. The image signal divided into blocks are supplied to a DCT (Discrete Cosine Transform) circuit 3, and are orthogonally transformed to change the data from the spatial domain into data in the spatial frequency domain.

The data in the frequency area are quantized in a quantizing circuit 4, and the quantized data are encoded in a variable length encoding circuit 5 to derive a desired transmitting rate for the data. The encoded data are supplied to an error correction code (ECC) encoding circuit 6 for adding parity codes to be used for error correcting. The encoding data and the parity codes are output from an output terminal 7 to a transmitting path 10. The transmitting path 10 may consist of a magnetic recording medium, a path via an artificial satellite, a cable, or the like. In this specification, it is assumed that errors will occur in the transmitting path 10 with a high degree of possibility.

The transmitted data are input from a terminal 11 and are supplied to an error correction circuit 12. The error correction circuit 12 corrects errors occurring in the transmitting path 10 by using the parity codes so far as possible. When uncorrectable errors which are impossible to correct in the error correction circuit 12 occur, the error correction circuit 12 outputs an error flag for a block including uncorrectable erroneous data, because, if at least one code in a certain block encoded by a variable length coding is erroneous, all of the decoded data in the block are not reliable.

Output data from the error correction circuit are supplied to a variable length decoding circuit 13 and decoded therein. The decoded data are reverse-quantized by the reverse quantizing circuit 14. The reverse-quantized data are supplied to a reverse DCT circuit 15 and are orthogonally transformed to convert the data from the spatial frequency domain back to the spatial domain.

An error concealing circuit 18 conceals the unreliable data, that is to say all data composing a block in which an error has occurred, and rearranges the image data such that the order of the image data corresponds to the raster scanning of the monitor by using a frame memory. A detailed circuit of the error concealing circuit 18 will be described later. The output signal of the error concealing circuit is externally output from an output terminal 19 to display the reproduced image by the monitor.

The error flag produced by the error correction circuit is supplied to a concealing flag generating circuit 16 which modifies the error flag to produce a concealing flag. The concealing flag corresponds to the order of the image signal output from the error concealing circuit 18. A timing control circuit. 17 controls operating timings of the error concealing circuit 18 and the concealing flag generating circuit 16 such that the image signal coincides with the error concealing flag.

Figure 4:
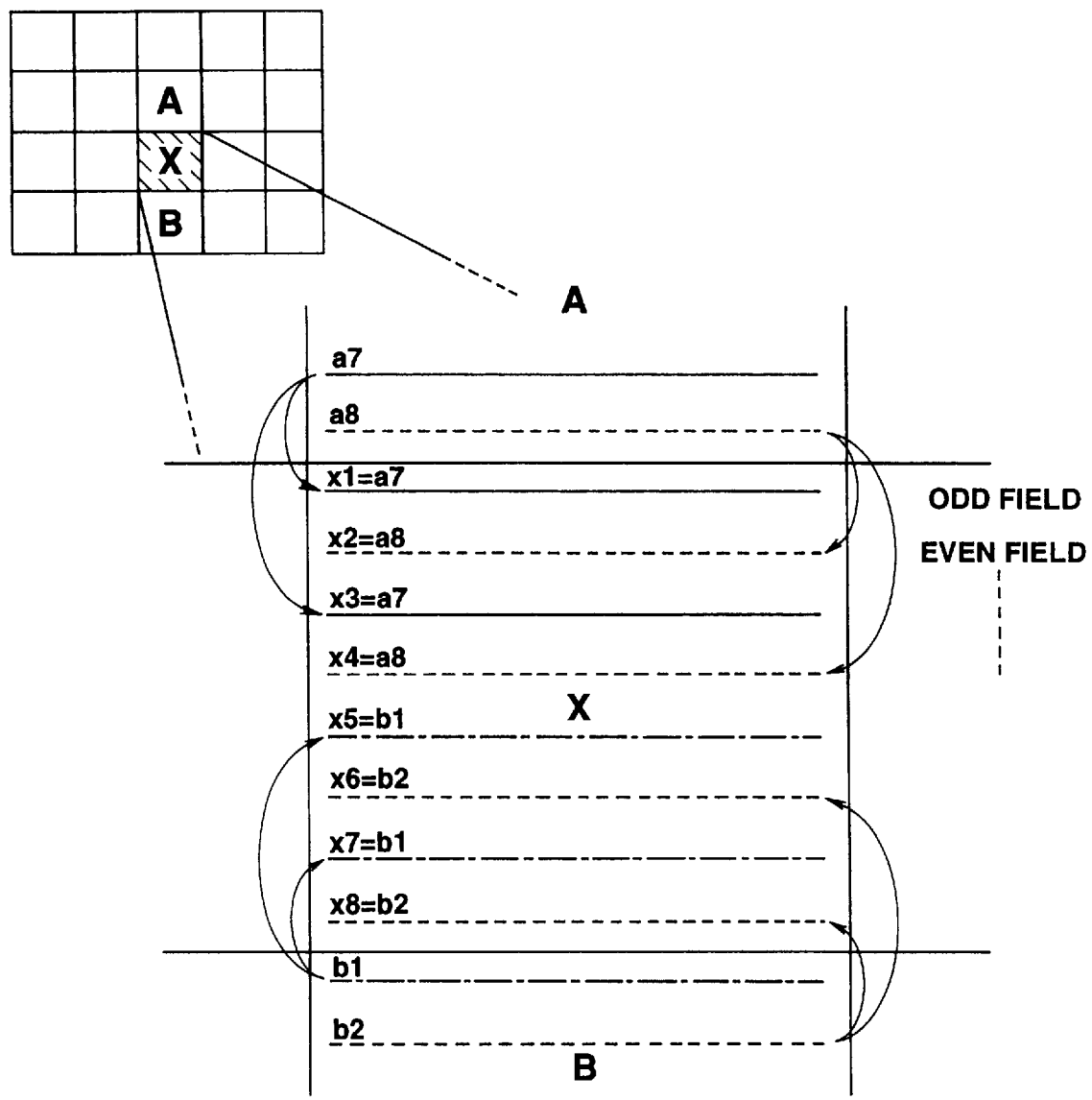
FIG. 4 illustrates the idea of a first embodiment of the present invention.

FIG. 4 illustrates an idea for concealing the unreliable block according to a first embodiment of the present invention. In FIG. 4, capital letters A, X, B show encoding blocks each of which comprises (8×8) pixels, and small letters, a, x, b followed by numbers 1, 2, 3 etc, show lines forming the blocks and the image signal. Lines followed by odd numbers are lines in an odd field, and lines followed by even numbers are lines in an even field.

Suppose that a block X is impossible to decode and blocks A, B positioned above and below the block X are decodable.

According to the idea of this embodiment, data of lines x1–x4 corresponding to the upper N/2(=4) lines of the block X which is impossible to decode are replaced with data of lines a7, a8 most closely positioned to the uppermost lines x1, x2 of the block X in a common field among lines of the blocks A, B. In short, lines x1, x2, x3, x4 are replaced with lines a7, a8, a7, a8, respectively, as indicated in FIG. 4 by x1=a7, x2=a8, x3=a7 and x4=a8. And data of lines x5–x8 corresponding to lower N/2(=4) lines of the block X are replaced with data of lines b1, b2 most closely positioned to the lowest lines x7, x8 of the block X in a common field. In short, x5=b1, x6=b2, x7=b1 and x8=b2.

In this embodiment, it is supposed that the block is composed of (8×8) pixels, only data of vertically adjacent three lines in the common field are output as the same data.

Figure 5:
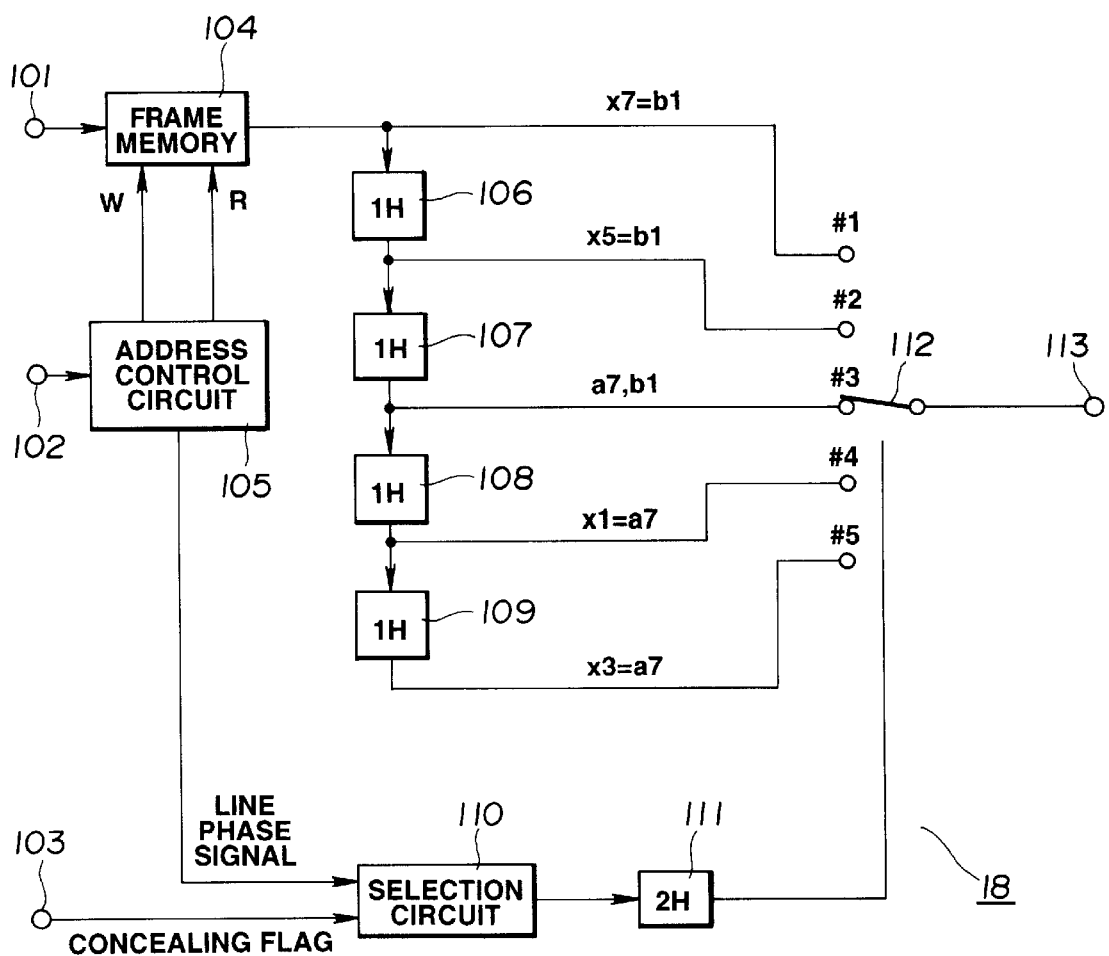
FIG. 5 is a block diagram of a circuit which puts the idea of the first embodiment into practice.

FIG. 5 is a block diagram of the error concealing circuit 18 shown in FIG. 2 according to the first embodiment.

In FIG. 5, the decoded data output from the reverse DCT circuit 15 are input to an input terminal 101, and are written in a frame memory 104. Timing signals generated by the timing control circuit 17 are input to an input terminal 102, and are supplied to an address control circuit 105. The address control circuit 105 outputs a write enable signal and a write address signal which are shown by W in FIG. 5 according to the image signal divided into the blocks, and outputs a read enable signal and a read address signal which are shown by R in FIG. 5 according to the order corresponding to the raster scanning. Accordingly, the frame memory outputs the rearranged image data.

The rearranged image data are directly supplied to a terminal #1 of a switching circuit 112 and are delayed by one horizontal scanning period (one-line period) of the image data by delay circuits 106, 107, 108, 109. The output data of the delay circuits 106, 107, 108, 109 are supplied to respective terminals #2, #3, #4 and #5.

Figure 6:
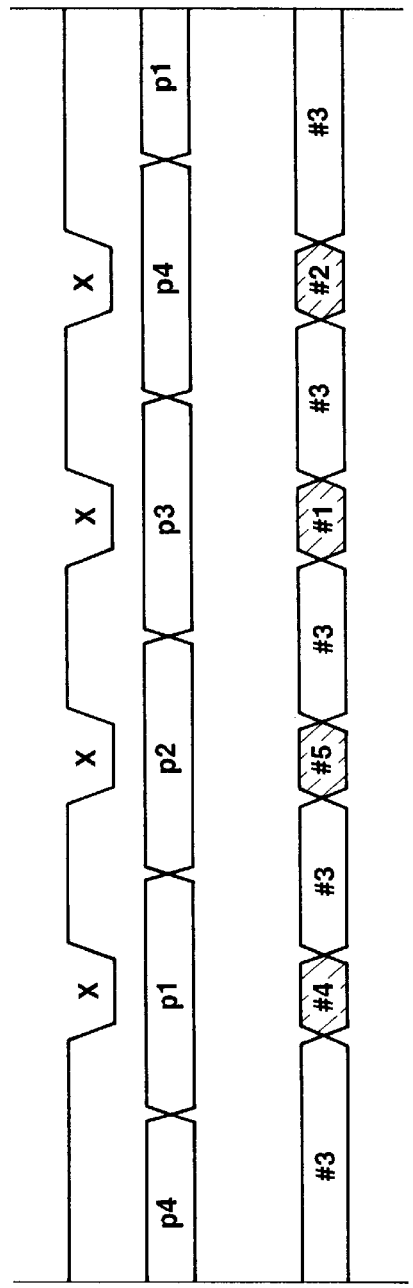
FIG. 6(a), 6(b) and 6(c) constitute a timing chart which shows modelled wave-forms of signals in the circuit of FIG. 5.

The address control circuit 105 further outputs a line phase signal which indicates a phase of each line of the image data output from the frame memory 104. In other words, the line phase signal indicates to which line the image signal relates in the same field. The actual line phase signal is shown in FIG. 6 (b). For example, line-phases of the lines x1, x3, x5 and x7 are p1, p2, p3, p4 in the odd field respectively, and line phases of the lines x2, x4, x6 and x8 are p1, p2, p3, p4 in the even field respectively.

On the other hand, the error concealing flag produced by the concealing flag generating circuit 16 is input from an input terminal 103, and indicates whether or not data read out from the frame memory 104 is in an unreliable block. The error concealing flag is shown in FIG. 6 (a).

A selection circuit 110 outputs a line selection signal depending on the error concealing flag and the line phase signal. The line selection signal indicates one of the terminals #1–#5 to be available for concealing unreliable data as shown in FIG. 6 (c). For instance, when dependable data are read out from the frame memory 104, the line selection signal indicates the terminal #3. The line selection signal is delayed by a delay circuit 111 for two horizontal scanning periods. Therefore reliable data are always delayed for two horizontal scanning periods, and are output to an output terminal 113 via the terminal #3. In other words, the line selection signal is delayed according to a path through which reliable data are transmitted.

Depending on the above-mentioned constructions, the image data concealed according to the idea illustrated in FIG. 4 are output from the output terminal 113.

Figure 7:
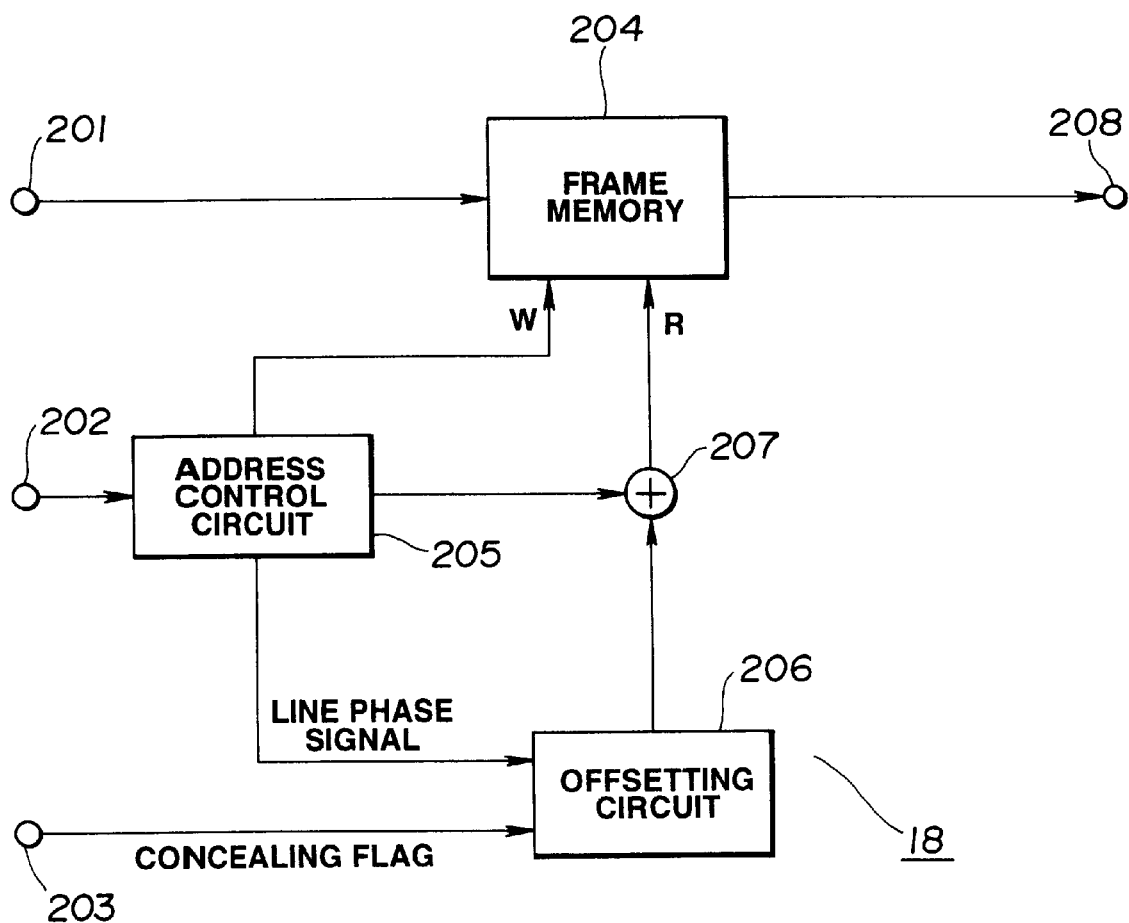
FIG. 7 is a block diagram of another circuit which puts the idea of the first embodiment into practice.

The idea illustrated in FIG. 4 is also able to be put into practice by controlling addresses applied to the memory for read-out of data. FIG. 7 is a block diagram of a circuit which is able to put the idea of the first embodiment into practice such a way.

Input terminals 201, 202 and 203 shown in FIG. 7 receive signals the same as signals received at the input terminals 101, 102 and 103 shown in FIG. 5. The frame memory 204 consists of a random access memory and is controlled by a write control signal (W) composed of a write enable signal and a write address signal and a read control signal (R) composed of a read enable signal and a read address signal. An address control circuit 205 works similarly to the address control circuit 105 shown in FIG. 5 to rearrange the image data.

An offsetting circuit 206 operates based on the line phase signal and the concealing flag such that an offsetting signal is produced according to the line phase signal for replacing all lines of the block X with data of lines a7, a8, b1, b2 as shown in FIG. 4. The off-setting signal is supplied to an adding circuit 207 and is added to the read address signal produced by the address control circuit 205. The output signal of the adding circuit 207 is input to the frame memory 204 as a signal for controlling the read address thereof.

Table 1 shows relations between the line phases x1–x8 in the block X and the offsetting extents provided by the off-setting signal when the concealment is executed and not.

TABLE 1

| LINE PHASES | NOT CONCEAL (NORMAL) | CONCEAL |
|---|---|---|
| x1 | 0 | −(8j + 2) |
| x2 | 0 | −(8j + 2) |
| x3 | 0 | −(8j + 4) |
| x4 | 0 | −(8j + 4) |
| x5 | 0 | 8k + 4 |
| x6 | 0 | 8k + 4 |
| x7 | 0 | 8k + 2 |
| x8 | 0 | 8k + 2 |

In the Table 1, j and k indicate numbers of blocks between the block to be concealed and reliable blocks to be used for concealing in upper and lower directions. For example, when the blocks A, B to be used for concealing are adjacent to the block X to be concealed as shown in FIG. 4, both of j and k are zero.

It is described above by using FIG. 7 that the actual circuit of the error concealing circuit controls the read address of the frame memory. Needless to say, however, a circuit controlling the write address is also able to execute the concealment the same as the circuit shown in FIG. 7. Needless to say, also, only odd or even numbers are used for the line phases in the Table 1, and the extents of offsetting become halved when the frame memory 204 is replaced with a field memory.

Figure 8:
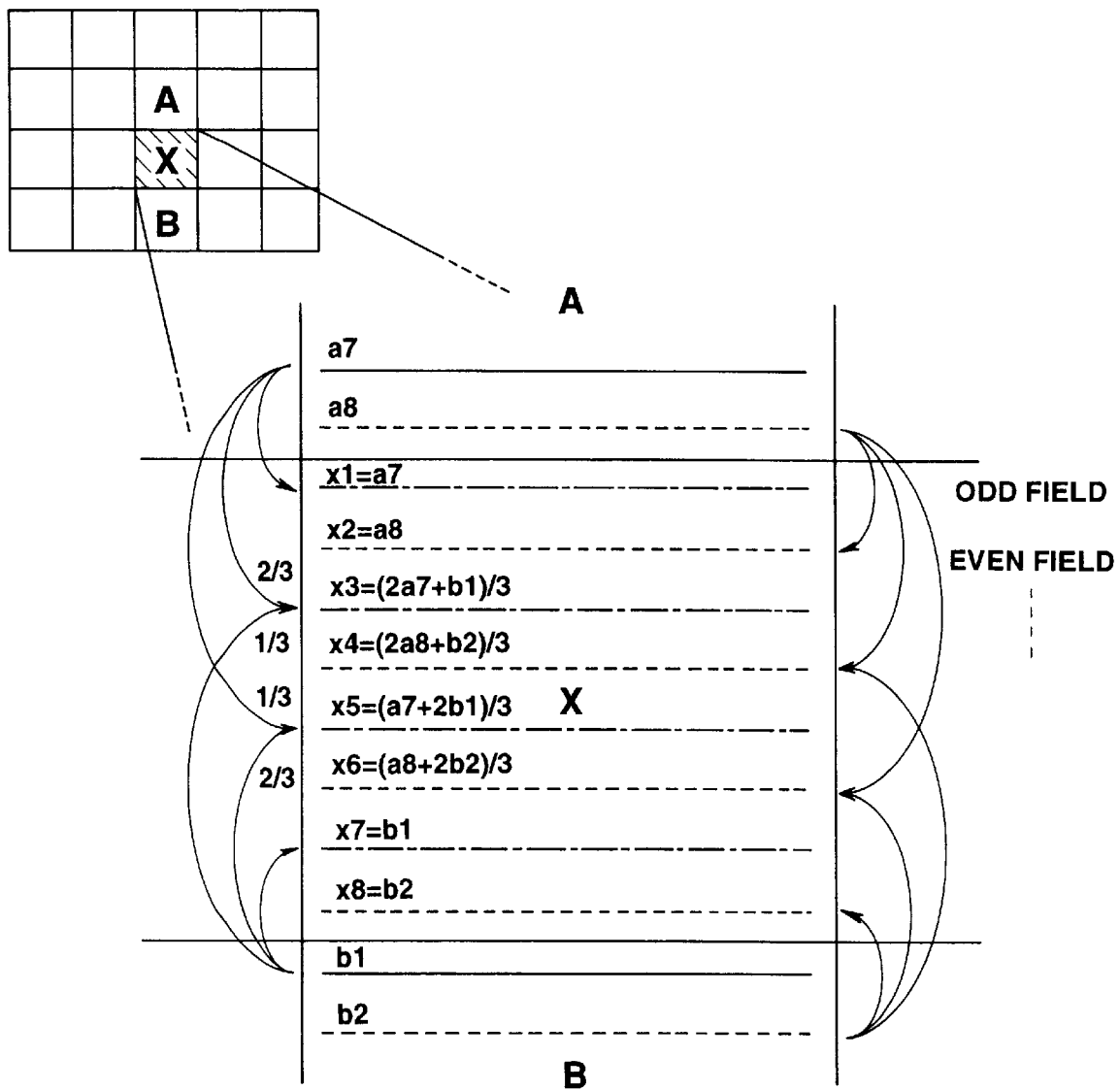
FIG. 8 illustrates the idea of a second embodiment of the present invention.

FIG. 8 illustrates an idea to conceal an unreliable block according to a second embodiment of the present invention. In FIG. 8, the same numbers are attached to elements similar to the elements shown in FIG. 4.

Suppose again that the block X is impossible to decode, that is, the unreliable block, and the blocks A, B positioned above and below the block X are decodable.

The number G of upper special lines and the number H of lower special lines are specified 2 respectively, and data of the most upper G(=2) special lines x1, x2 and data of the lowest H(=2) special lines x7, x8 are simply replaced with data of lines a7, a8 and b1, b2 respectively which the closest lines to the block X in the blocks A, B. All the rest of the lines in the block X, in short lines x3–x6, are linearly interpolated by using the data of lines a7, a8, b1, b2.

In detail, the lines x1, x2 corresponding to the uppermost G lines among the lines x1 to x8 of the unreliable block X are replaced with the lines a7, a8 which are closest to the lines x1, x2 among the lines of the block A in a common field. In short, formulas x1=a7, and x2=a8 apply.

Further, the lines x7, x8 corresponding to the lowest H lines are similarly replaced with the lines b1, b2 which are closest to the lines x7, x8 among the lines of the block B in the common field. In short, formulas x7=b1 and x8=b2 apply.

The remaining [N−(G+H)] (=4) lines x3 to x6 are replaced with data which are computed according to a linear interpolating method in respective fields by using the data of the uppermost lines x1, x2 replaced with the data of lines a7, a8 and the data of the lowest lines x7, x8 replaced with the data of lines b1, b2. In short, in odd fields, formulas x3=[2(a7)+b1]/3 and x5=[a7+2(b1)]/3 apply and, in even fields, formulas x4=[2(a8)+b2]/3, and x6=[a8+2(b2)]/3 apply.

Figure 9:
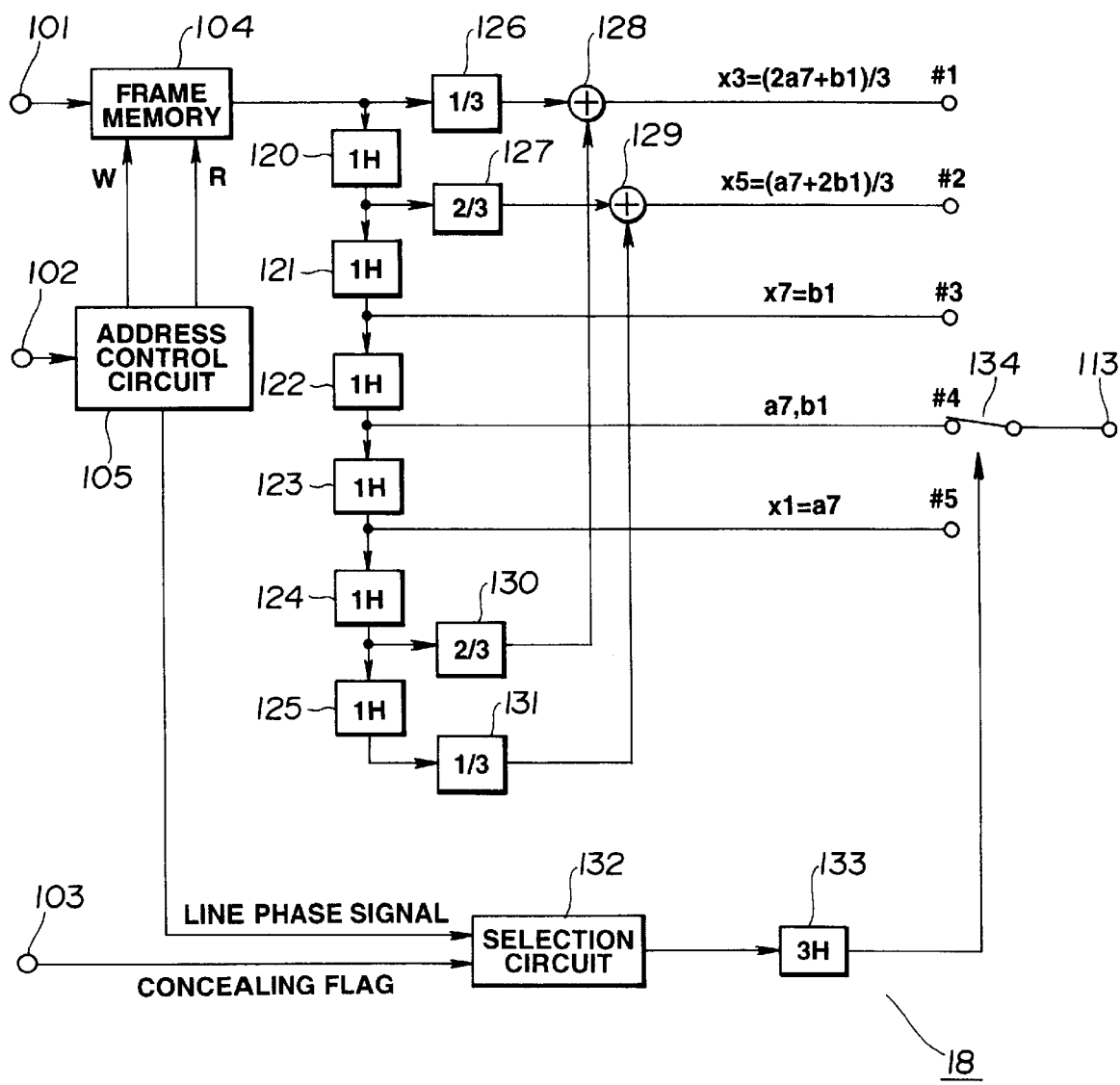
FIG. 9 is a block diagram of a circuit which puts the idea of the second embodiment into practice.

FIG. 9 is a block diagram of the error concealing circuit 18 shown in FIG. 2 to which the second embodiment is applied. In FIG. 9, the same numbers are attached to elements similar to the elements shown in FIG. 5.

The image data rearranged according to the raster scanning are read out from the frame memory 104 the same as in the circuit shown in FIG. 5, and are supplied to an interpolation coefficient multiplying circuit 126 and serially connected delay circuits 120 to 125. The rearranged data are delayed by one-line period by each delay circuit 120 to 125. The output data of the delay circuits 121, 122, 123 are supplied to respective terminals #3, #4, #5 of a switching circuit 134, and the output data of the delay circuits 120, 124, 125 are supplied to interpolation coefficient multiplying circuits 127, 130, 131 respectively.

When the reliable data are read out from the frame memory 104, the switching circuit 134 outputs data supplied to the terminal #4 which are delayed for three-lines period. The multiplying circuits 126, 127, 130, 131 multiply by 1/3, 2/3, 2/3, and 1/3, respectively. Output data of the circuit 126 are added to output data of the circuit 130 by an adding circuit 128, and output data of the circuit 127 are added to output data of the circuit 131 by an adding circuit 129. The output data of the adding circuits 128, 129 are supplied to respective terminals #1, #2 of the switching circuit 134.

Figure 10:
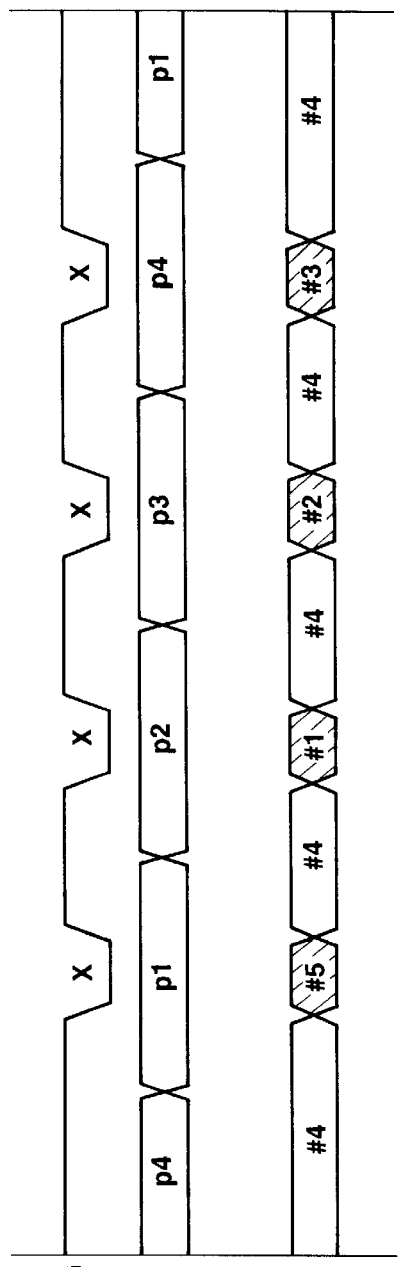
FIGS. 10(a), 10(b) and 10(c) constitute; and a timing chart which shows modelled wave-forms of signals in the circuit of FIG. 9.

The line phase signal shown in FIG. 10(b) is produced by the address control circuit 105 and the error concealing flag shown in FIG. 10 (a) is input from the input terminal 103 the same as the circuit shown in FIG. 5. A selection circuit 132 outputs a line selection signal indicating one of the terminals #1–#5 as shown in FIG. 10 (c) depending on the error concealing flag and the line phase signal.

The line selection signal is delayed by a delaying circuit 133 for three horizontal scanning periods which is as same as the period for delaying the reliable data.

Thanks to the above-mentioned construction, the unreliable image data are concealed according to the idea shown in FIG. 8. For example, when the unreliable image data in the lines x1, x3, x6, x8 are supplied to the terminal #4, the switching circuit 134 selects respective terminals #5, #1, #2, #3 and the data a7, [2(a7)+b1]/3, [a8+2(b2)]/3, b2 are output from the output terminal 113.

Figure 11:
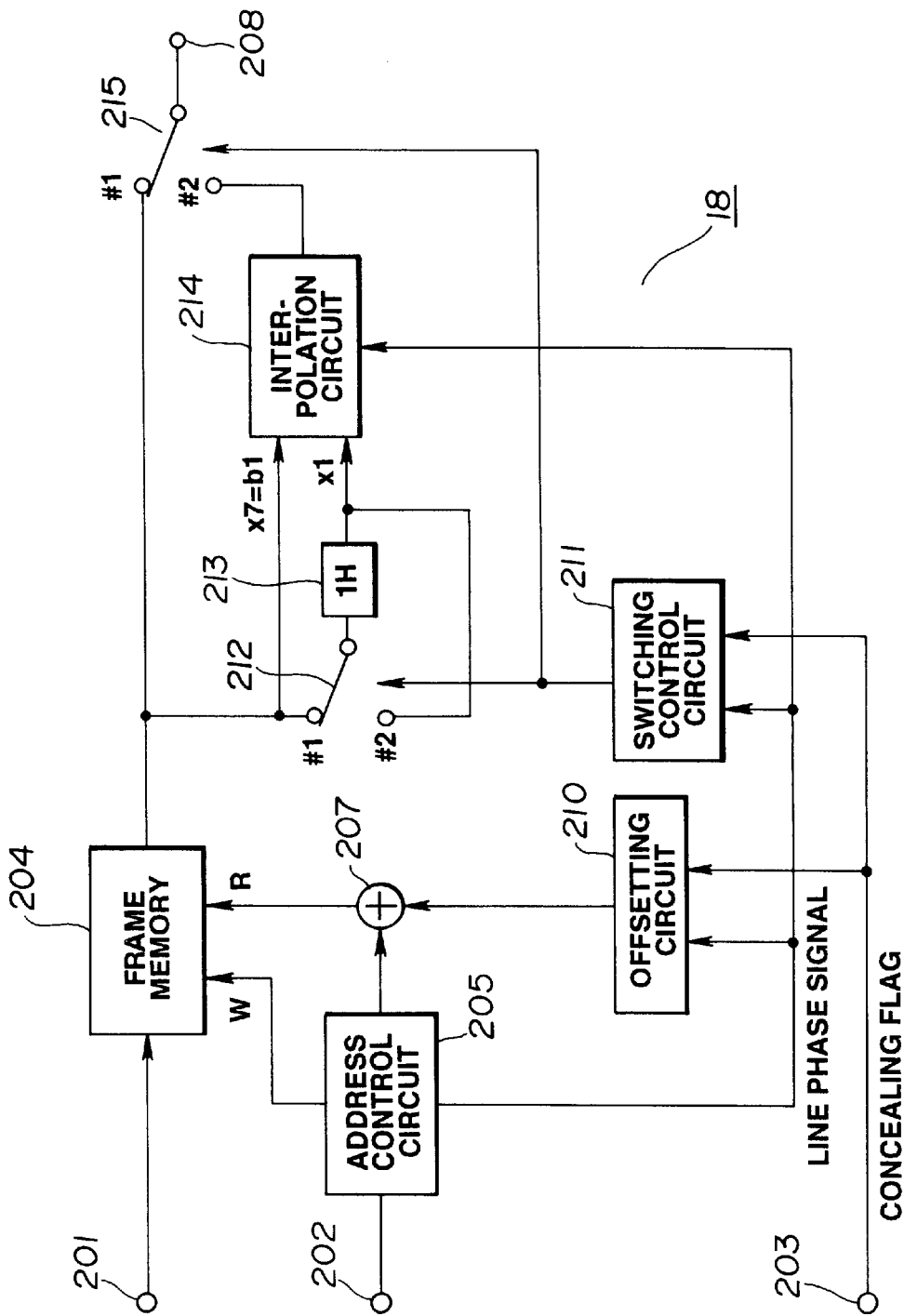
FIG. 11 is a block diagram of another circuit which puts the idea of the second embodiment into practice.

FIG. 11 shows a block diagram of a circuit which is able to put the idea of the second embodiment into practice by controlling the reading address of the frame memory. In FIG. 11, the same numbers are attached to elements similar to the elements shown in FIG. 7.

The rearranged image data read out from the frame memory 204 are supplied to a terminal #1 of a switching circuit 215. When reliable data are read out from the frame memory 204, the switching circuit 215 selects the terminal #1 as follows and outputs the data read out from the memory 204 directly.

An offsetting circuit 210 produces an offsetting signal based on the line phase signal and the concealing flag. A Table 2 shows relations between the line phases x1 to x8 in the block X and the offsetting extents, when the concealment is executed and not.

TABLE 2

| LINE PHASES | NOT CONCEAL (NORMAL) | CONCEAL |
|---|---|---|
| x1 | 0 | −2 |
| x2 | 0 | −2 |
| x3 | 0 | 6 |
| x4 | 0 | 6 |
| x5 | 0 | 4 |
| x6 | 0 | 4 |
| x7 | 0 | 2 |
| x8 | 0 | 2 |

The adding circuit 207 adds the offsetting signal to the read address signal produced by the address control circuit 205, and supplies an output signal to the frame memory 204 as a read address control signal. According to the Table 2, the frame memory 204 reads the data of lines a7, a8, b1, b2, b1, b2, b1, b2 instead of the data of lines x1 to x8, when the block X is unreliable.

Figure 12:
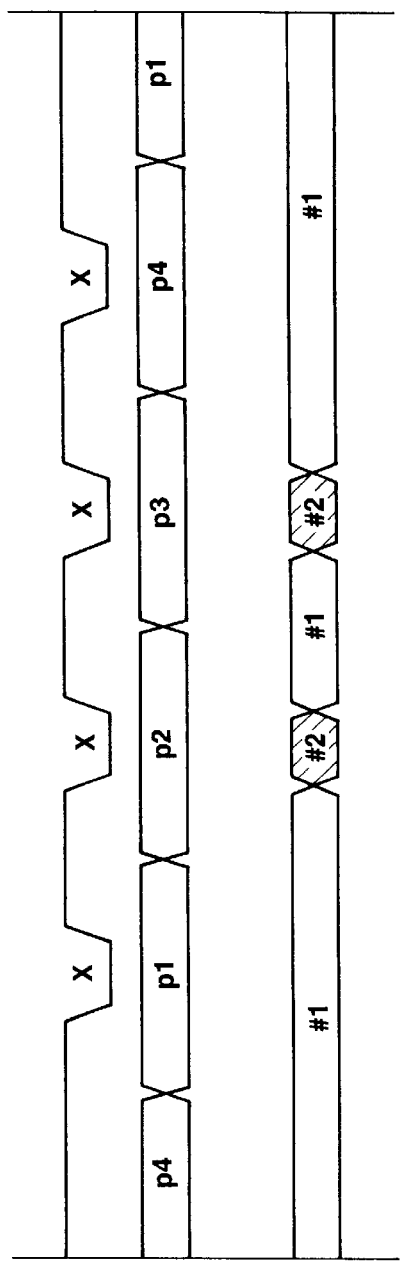
FIGS. 12(a), 12(b) and 12(c) constitute a timing chart which shows modelled wave-forms of signals in the circuit of FIG. 11.

On the other hand, a switching control circuit 211 produces a switching control signal for switching between a mode in which reliable data are output without concealing or unreliable data are merely replaced with the reliable data, and a mode in which the unreliable data are replaced with the interpolated data. A timing chart shown in FIG. 12 shows relations between the concealing flag (a), the line phase signal (b) and the switching control signal (c). Switching circuits 212, 215 are switched by the switching control signal for switching the above-mentioned two modes.

A delay circuit 213 is directly connected to an output terminal of the frame memory 204 via the terminal #1 of the switching circuit 212 unless interpolation is being performed, and delays the signal read out from the memory for one horizontal scanning period. On the other hand, the delay circuit 213 repeatedly outputs the data of the same line which is the last line before starting the interpolation via the terminal #2 of the switching circuit 212. In short, the data of line x1 or line x2, which are already replaced with the data of line a7 or line a8, are repeatedly output from the delay circuit 213 while the interpolation is being executed. And, while the delay circuit 213 is outputting the data of line a7 or a8, the frame memory 204 repeatedly outputs the data of line b1 or b2, which replace the data of line x7 or x8, according to the Table 2.

An interpolation circuit 214 is controlled by the line phase signal such that the computing coefficients to be used for linear interpolation are changed according to the line phase. Table 3 shows the relations between the line phases and the output value of the interpolation circuit as interpolative data. In the Table 3, x1, x2, x7 and x8 mean the data of the lines x1, x2, x7 and x8 replaced with the data of the lines a7, a8, b1, b2, respectively.

TABLE 3

| LINE PHASES | LINEAR INTERPOLATIVE DATA |
| --- | --- |
| x3 | [x1 + 2(x7)]/3 |
| x4 | [x2 + 2(x8)]/3 |
| x5 | [2(x1) + x7]/3 |
| x6 | [2(x2) + x8]/3 |

When a field memory is used instead of the frame memory 204, only odd or even numbers are used for the line phases in the Table 2 and the Table 3 and the extent of offsetting shown in the Table 2 becomes halved.

Figure 13:
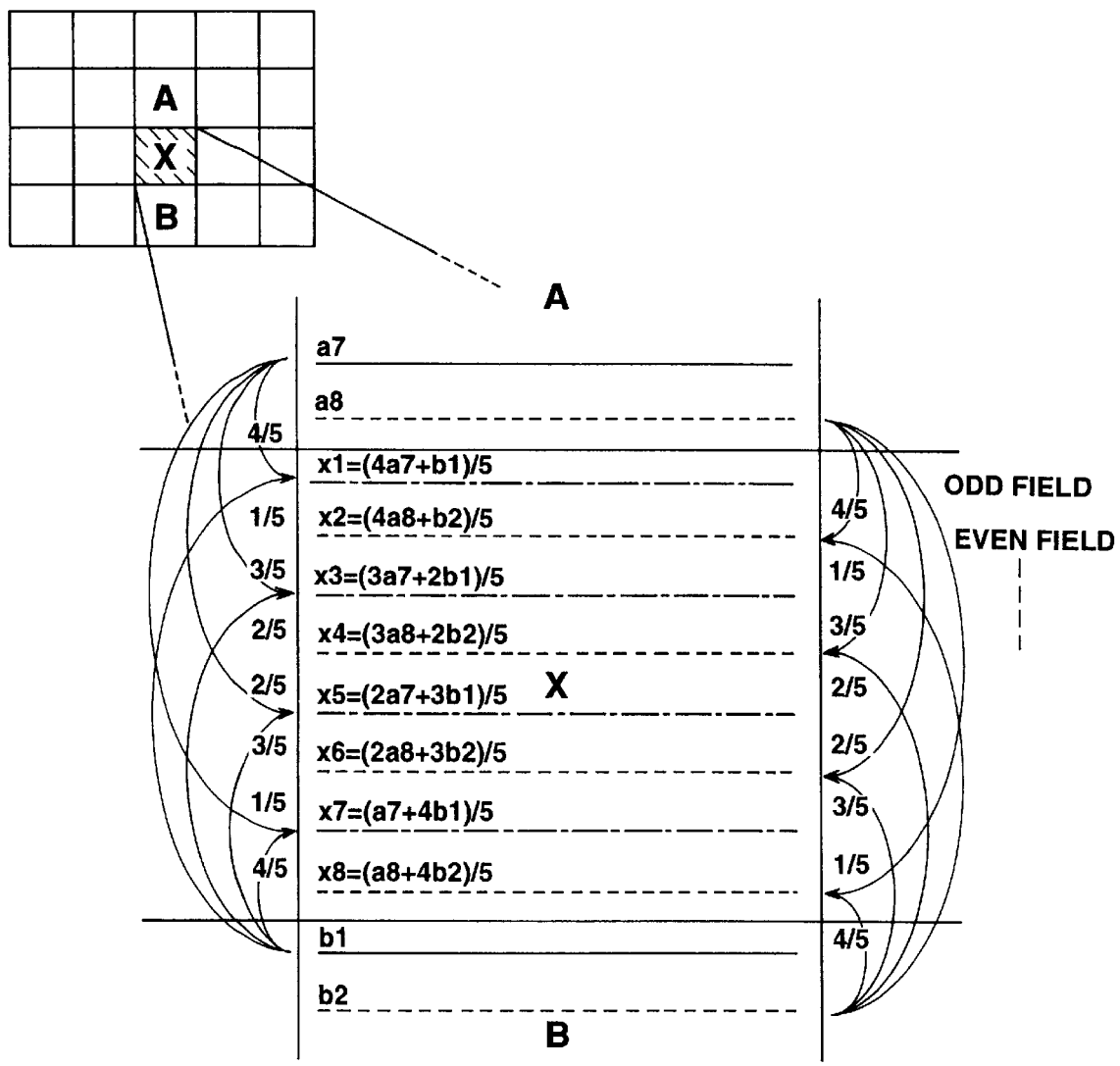
FIG. 13 illustrates the idea of the third embodiment of the present invention.

FIG. 13 illustrates an idea to conceal the unreliable block according to a third embodiment of the present invention. In FIG. 13, the same numbers are attached to elements similar to the element shown in FIG. 4 and FIG. 8, and it is also supposed that the block X is unreliable and the blocks A, and B, positioned at the upper and lower sides of the block X, are reliable.

According to the third embodiment, all of the lines in the block X are linearly interpolated by using the data of the lines a7, a8 closest to the uppermost lines x1, x2 in respective fields and the data of the lines b1, b2 closest to the lowest lines x7, x8.

In short, in odd fields, formulas x1=[4(a7)+b1]/5, x3=[3(a7)+2(b1)]/5, x5=[2(a7)+3(b1)]/5, and x7=[a7+4(b1)]/5 apply, and in even fields, formulas x2=[4(a8)+b2]/5, x4=[3(a8)+2(b2)]/5, x6=[2(a8)+3(b2)]/5 and x8=[a8+4(b2)]/5 apply.

Figure 14:
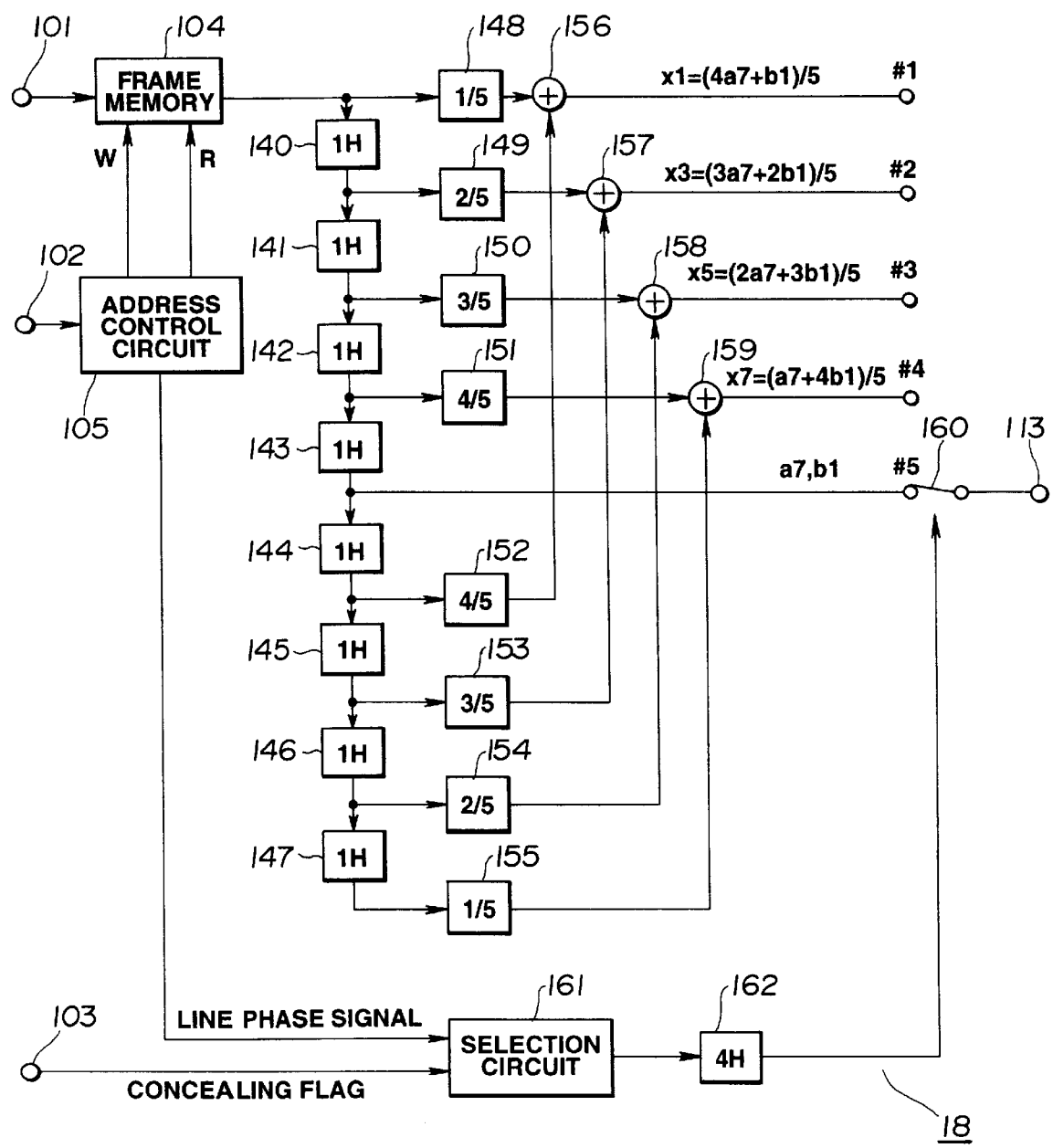
FIGS. 14 is a block diagram of a circuit which puts the idea of the third embodiment into practice.

FIG. 14 is a block diagram of the error concealing circuit 18 shown in FIG. 2 in accordance with the third embodiment. In FIG. 14, the same numbers are attached to similar elements to the elements shown in FIG. 5 and FIG. 9.

The rearranged image data according to the raster scanning are read out from the frame memory 104, and are supplied to a multiplying circuit 148 for multiplication by an interpolation coefficient 1/5 and to serially connected delay circuits 140 to 147. The circuits 140 to 147 delay the rearranged image data by one line period each. The output data of a delay circuit 143 delayed for four line periods are supplied to a terminal #5 for outputting reliable data which do not need to be replaced.

The output data of delay circuits 140, 141, 142, 144, 145, 146 and 147 are supplied to respective interpolative coefficient multiplying circuits 148, 149, 150, 151, 152, 153, 154 and 155. The circuits 148 to 155 multiply by coefficients equal to 1/5, 2/5, 3/5, 4/5, 4/5, 3/5, 2/5 and 1/5 respectively. Output data of the circuits 148, 149, 150, 151 are added to output data of the circuits 152, 153, 154, 155 by adding circuits 156, 157, 158, 159 respectively. The output data of the adding circuits 156, 157, 158, 159 are supplied to respective terminals #1, #2, #3, #4 of a switching circuit 160.

Figure 15:
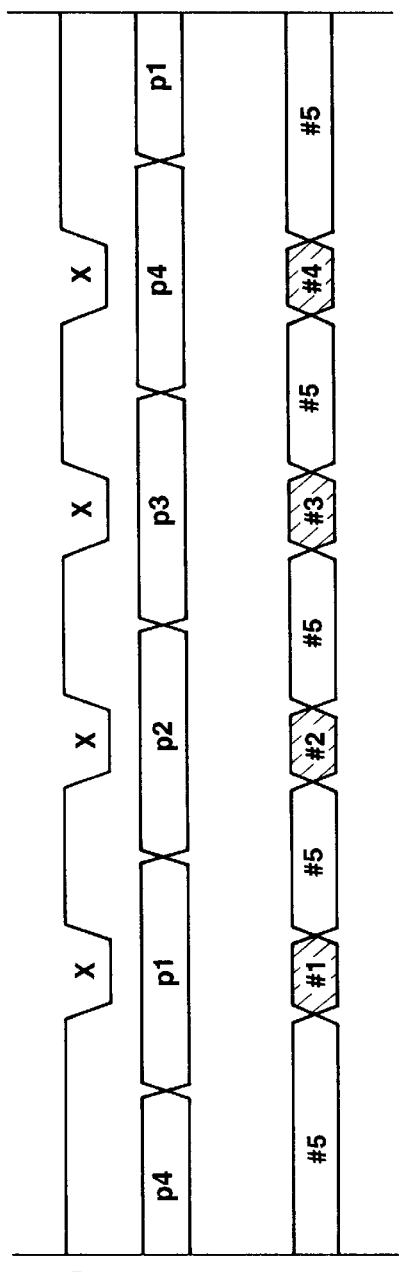
FIGS. 15(a), 15(b) and 15(c) constitute is a timing chart which shows modelled wave-forms of signals in the circuit of FIG. 14.

The line phase signal shown in FIG. 15(b) is produced by the address control circuit 105 and the error concealing flag shown in FIG. 15(a) is input from the input terminal 103 in the same manner as in the circuits shown in FIG. 5 and FIG. 9. A line selection signal indicating one of the terminals #1–#5 is produced by a selection circuit 161 depending on the error concealing flag and the line phase signal, and is delayed by a delay circuit 162 for four horizontal scanning periods which is the same as the period for delaying the reliable data.

Depending on the above-mentioned constructions, the unreliable image data are concealed according to the idea shown in FIG. 13. For instance, when the unreliable image data of the lines x1, x3, x6, x8 are supplied to the terminal #4, the switching circuit 160 selects respective terminals #1, #2, #3, #4 and outputs the data [4(a7)+b1]/5, [3(a7)+2(b1)]/5, [2(a8)+3(b2)]/5, [a8 +4(b2)]/5 to the output terminal 113, respectively.

Figure 16:
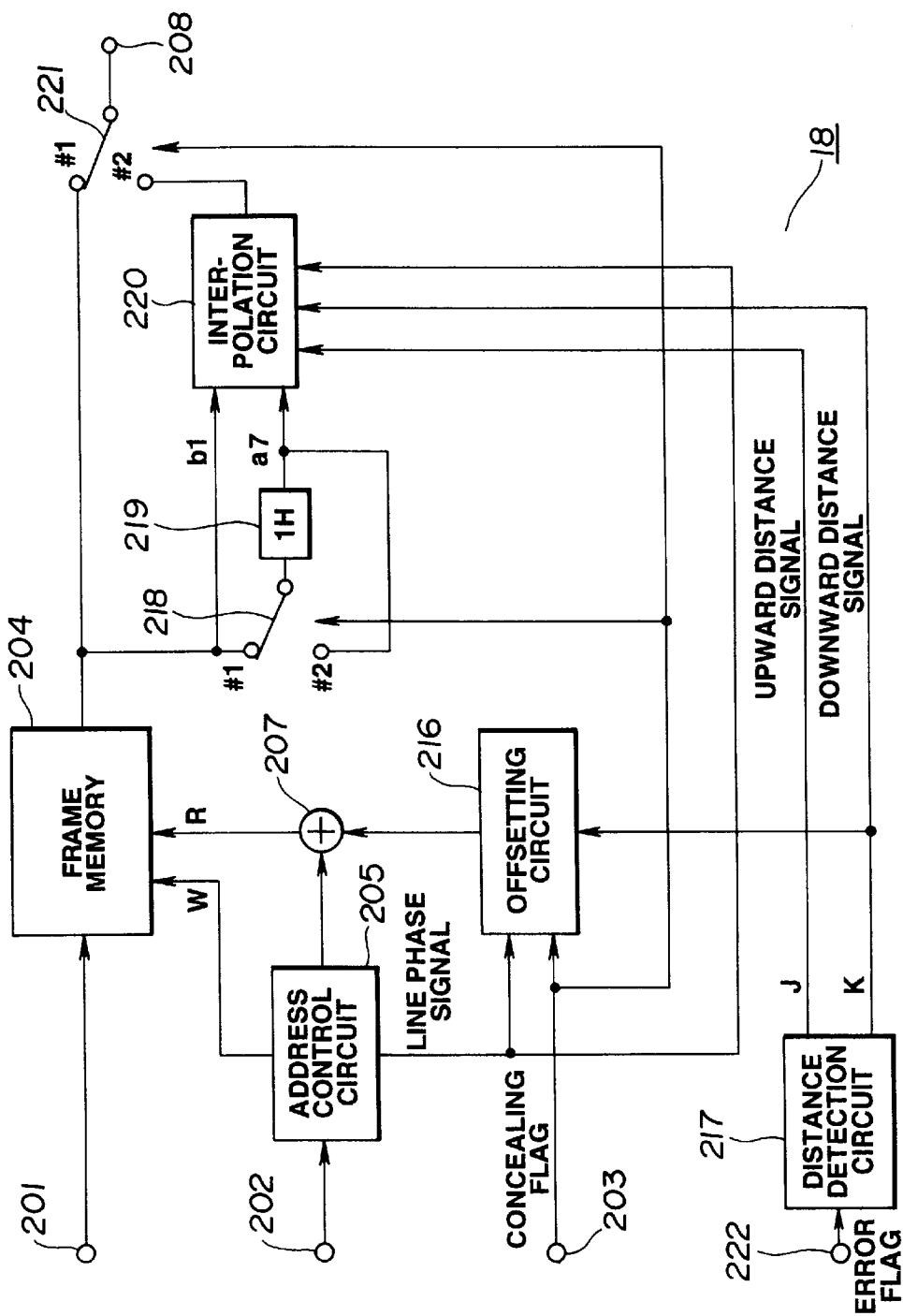
FIG. 16 is a block diagram of another circuit which puts the idea of the third embodiment into practice.

FIG. 16 is a block diagram of a circuit which is able to put the idea of the third embodiment into practice by controlling the reading address of the frame memory 204. In FIG. 16, the same numbers are attached to elements similar to the elements shown in FIG. 7 and FIG. 11.

The rearranged image data read out from the frame memory 204 are supplied to a terminal #1 of a switching circuit 221. When the reliable data are read out from the frame memory 204, a switching circuit 221 selects the terminal #1 according to the concealing flag and outputs the rearranged data read out from the frame memory 204 directly.

A switching circuit 218 selects the terminal #1 thereof, when the reliable data are read out. Accordingly, a delay circuit 219 usually outputs the reliable data delayed for one-line period, when the unreliable data are read out, the switching circuit 218 selects a terminal #2 according to the concealing flag and repeatedly outputs the lowest line of the reliable block which is closest above the unreliable block. For example, when the reliable block A is above and adjacent to the unreliable block X as shown in FIG. 13, the data of the line a7 or line a8 are repeatedly output from the delay circuit 213 while interpolation is being executed.

An input terminal 222 inputs the error flag generated by the error correction circuit 12 shown in FIG. 2 via a certain line not shown in FIG. 2. A distance detection circuit 217 receives the error flag and generates an upward distance signal (J) and a downward distance signal (K) which indicate the numbers of blocks between the block to be concealed and reliable blocks to be used for interpolating in upward and downward directions. When the upper and lower reliable blocks are adjacent to the unreliable block as shown in FIG. 13, both of the signals (J and K) are zero. These numbers J and K of the present frame are detected before the data of the present frame are read out from the memory 204, and are output from the circuit 217 at timings corresponding to timings of reading out the image data from the memory.

An offsetting circuit 216 produces an offsetting signal based of the line phase signal, the error concealing flag and the downward distance signal. A Table 4 shows relations between the line phases x1–x8 in the block X and the offsetting extents indicated by the offsetting circuit 216, when the concealment is executed and not.

TABLE 4

| LINE PHASES | NOT CONCEAL (NORMAL) | CONCEAL |
| --- | --- | --- |
| x1 | 0 | 8K + 8 |
| x2 | 0 | 8K + 8 |
| x3 | 0 | 8K + 6 |
| x4 | 0 | 8K + 6 |
| x5 | 0 | 8K + 4 |
| x6 | 0 | 8K + 4 |
| x7 | 0 | 8K + 2 |
| x8 | 0 | 8K + 2 |

In Table 4, "K" indicates the number of blocks between the block X and the closest reliable block thereto, as mentioned above. The adding circuit 207 adds the offsetting signal to the read address signal and supplies the output signal to the frame memory 204 for controlling the read address. In short, according to Table 4, when the error concealment is executed, the switching circuit 218 selects the terminal #1, the frame memory 204 repeatedly reads out the image data of the uppermost lines of the reliable block which is closest below the unreliable block. For example, when "K" is zero, the data of the line b1 or b2 are repeatedly read out from the frame memory 204.

Accordingly, when the switching circuits 218 and 221 select the terminals #2, the data of the line b1 or b2 and the data of the line a7 or a8 are supplied to an interpolation circuit simultaneously. The calculation carried out in the interpolation is changed according to the line phase signal, the upward distance signal and the downward distance signal as shown in Table 5. In Table 5 "J" and "K" are values of the upward distance signal and the downward distance signal.

TABLE 5

| LINE PHASES | INTERPOLATIVE DATA |
| --- | --- |
| x1 | $\{(4J + 1)a7 + (4K + 4)b1\}/(4J + 4K + 5)$ |
| x2 | $\{(4J + 1)a8 + (4K + 4)b2\}/(4J + 4K + 5)$ |
| x3 | $\{(4J + 2)a7 + (4K + 3)b1\}/(4J + 4K + 5)$ |
| x4 | $\{(4J + 2)a8 + (4K + 3)b2\}/(4J + 4K + 5)$ |
| x5 | $\{(4J + 3)a7 + (4K + 2)b1\}/(4J + 4K + 5)$ |
| x6 | $\{(4J + 3)a8 + (4K + 2)b2\}/(4J + 4K + 5)$ |
| x7 | $\{(4J + 4)a7 + (4K + 1)b1\}/(4J + 4K + 5)$ |
| x8 | $\{(4J + 4)a8 + (4K + 1)b2\}/(4J + 4K + 5)$ |

When the switching circuits 218, 221 select the terminals #2, the interpolated data shown in the Table 5 are output to the terminal 208 instead of the data of the unreliable block. It is apparent that the circuit shown in FIG. 16 gets the same result as the circuit shown in FIG. 14 when the numbers "K" and "J" are zero.

Figure 17:
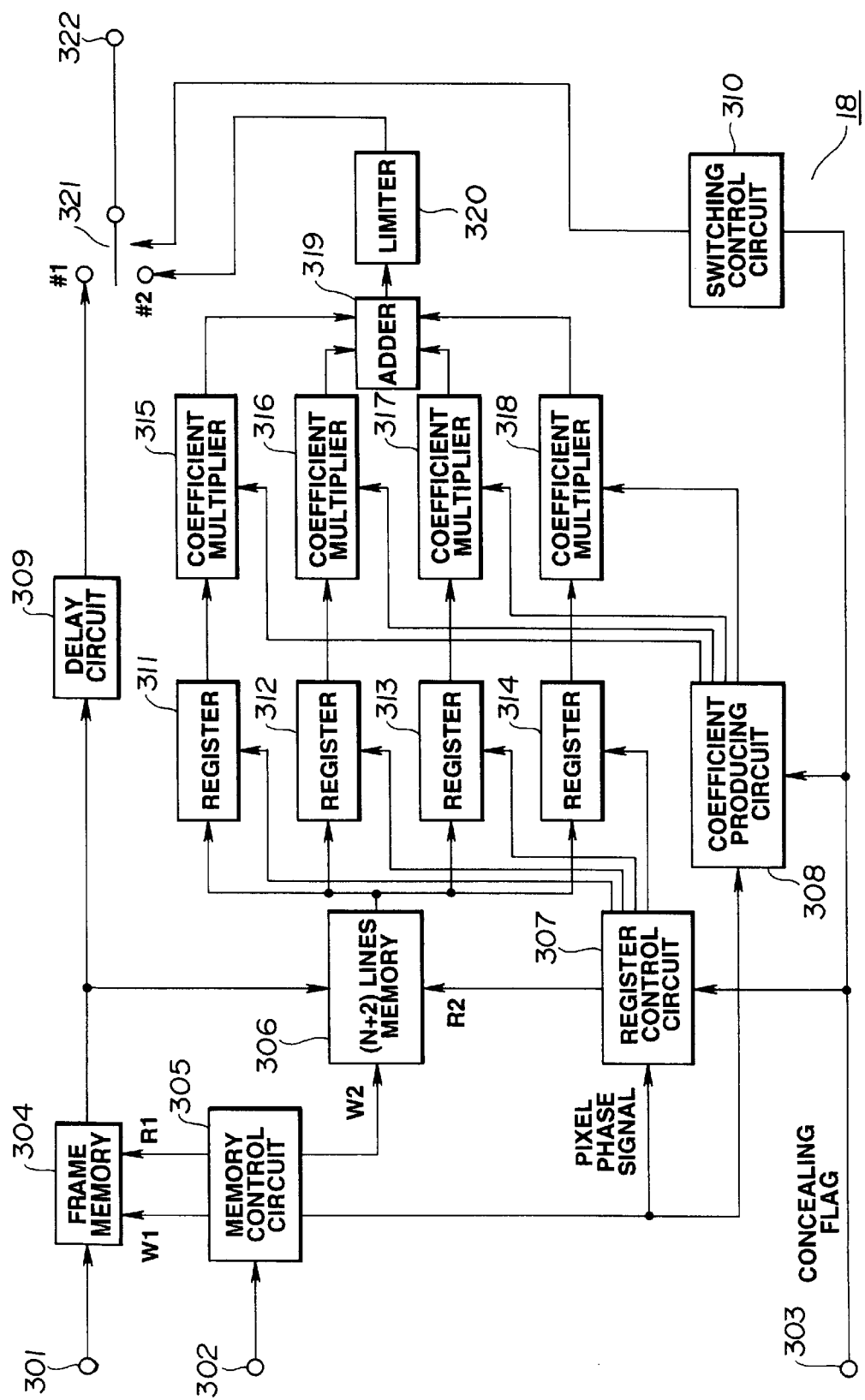
FIG. 17 is a block diagram of a circuit concerned with a fourth embodiment of the present invention.

FIG. 17 is a block diagram of a circuit which puts an idea of a fourth embodiment of the present invention into practice. In FIG. 17, an input terminal 301 receives image data which are output from the reverse DCT circuit 15 shown in FIG. 2, an input terminal 302 receives timing signals generated by the timing control circuit 17 also shown in FIG. 2, and an input terminal 303 receives an error concealing flag produced by the concealing flag generating circuit 16. A frame memory 304 operates the same as the frame memory shown in FIG. 5, in other words, the memory 304 reads out the rearranged image data according to the raster scanning depending on a write control signal (W1) and a read control signal (R1).

A memory control circuit 305 operates in response to the timing signals input from the terminal 302 and outputs the write control signal (W1), the read control signal (R1) and a second write control signal (W2) which controls a write address of an (N+2) lines memory 306, and a pixel phase signal which indicates two-dimensional positions of the image data in each block.

The rearranged image data read out from the frame memory 304 are supplied to a delay circuit 309 and the (N+2) lines memory 306.

The delay circuit 309 compensates a delay caused by an interpolation circuit. The (N+2) lines memory 306 stores the image data of (N+2) lines which consists of N lines corresponding to a subject block and two lines being adjacent, above and below those N lines.

The interpolation circuit is composed of registers 311 to 314, coefficient multiplier 315 to 318, an adder 319, a limiter 320, a register control circuit 307, and a coefficient producing circuit 308. The limiter outputs interpolated image data which will described below.

A switching control circuit 310 controls a switching circuit 321 according to the concealing flag, and compensates the delay caused by the interpolated circuit. Therefore, when the delay circuit 309 outputs the data of the reliable block, the switching circuit 321 outputs them via a terminal #1. And, when the delay circuit 309 outputs the data of the unreliable block, the switching circuit 321 outputs the interpolated data via a terminal #2.

An idea for producing the interpolated data is described as follows. Suppose that a block A shown in FIG. 18 is impossible to decode. In short, the block A is unreliable. When the data of the block A are output from the delay circuit 309, the (N+2) lines memory stores the data including $x(1,1), x(2,1), \ldots, x(1,1), x(N,1)$ of a block B, $x(1,2), x(2,2) \ldots, x(1,2), \ldots, x(N,2)$ of a block C, $y(1,1), y(2,1), \ldots, y(m,1), \ldots, y(N,1)$ of a block D, and $y(1,2), y(2,2), \ldots, y(m,2), \ldots, y(N,2)$ of a block E, which have already read out from the frame memory.

In FIG. 18, it is supposed that "N" is 8, the blocks B, C, D, and E are reliable, and interpolated data of the block A are $S(1,1), S(1,2), \ldots, S(1,N), S(2,1), S(2,2), \ldots, S(nx,ny), \ldots S(N,N-1), S(N,N)$. A method for calculating desired interpolated data $S(nx,ny)$ is described in the following.

Data $X(1,nx)$, meaning data calculated according to a one-dimensional linear interpolation only using a correlation of a vertical direction for data positioned on the desired line (nx) and on a certain column (1), and data $Y(m,ny)$, meaning data calculated according to a one-dimensional linear interpolation only using a correlation of a horizontal direction for data positioned on a certain line (m) and on the desired column (ny), are calculated according to the following formulas (1) and (2).

$$X(l,nx)=x(l,1)+nx*\{x(l,2)-x(l,1)\}/(N+1) \quad (1)$$

$$Y(m,ny)=y(m,1)+ny*\{y(m,2)-y(m,1)\}/(N+1) \quad (2)$$

In the formulas (1), (2), each of nx, ny, 1, and m is an integer being 1 or more, and N or less.

Further, the desired interpolated data are expressed as the following formula (3).

$$S(nx,ny)=\{X(ny,nx)+Y(nx,ny)\}/2 \quad (3)$$

In short, the desired interpolated data are calculated as average data of the interpolated data calculated by using the vertical correlation and the interpolated data calculated by using the horizontal correlation.

According to the formulas (1), (2) and (3), the desired interpolated data can be calculated as shown by the following formula (4).

$$S(nx,ny)=\{(N+1-nx)*x(ny,1)+nx*x(ny,2)+(N+1-ny)*y(nx,1)+ny*y(nx,2)\}/2(N+1) \quad (4)$$

Therefore, the interpolation circuit takes in the data $x(ny,1), x(ny,2) y(nx,1)$ and $y(nx,2)$ and carried out the calculation shown by the formula (4).

Detailed operations of the interpolation circuit are described by using FIG. 17 as follows.

When the interpolated data $S(nx,ny)$ are to be calculated, the register 311 latches the image data $x(ny,1)$ read out from the (N+2) lines memory 306. The register control circuit 307 controls a read address of the (N+2) lines memory 306 by producing a second read control signal (R2) and controls operations of the registers 311 to 314. The registers 312, 313, 314 similarly latch the data $x(ny,2), y(nx,1), y(nx,2)$, respectively.

The coefficient producing circuit 308 produces coefficients (N+1-nx)/2(N+1),nx/2(N+1), (N+1-ny)/2(N+1), ny/(N+1) and supplies them to respective coefficient multipliers 315, 316, 317, 318. The multipliers 315, 316, 317, 318 multiply the image data latched by the register 311, 312, 313, 314 by the coefficients supplied from the circuit 308, and supply the multiplied results to the adder 319.

The adder calculates a sum of the multiplied results supplied from the multipliers 315 to 318, and supplies an output to the limiter 320. The limiter limits the data output from the adder 319 in a predetermined range not to be an extraordinary value, and outputs the limited data as the desired interpolated data S(nx,ny).

In this way, the interpolated data S(nx,ny+1) are produced next to the data S(nx,ny+1), and all of the desired interpolative data are consecutively produced and supplied to the terminal #2 of the switching circuit 321.

According to above-mentioned constructions, the data sequence which is composed of the reliable data and the interpolated data is output from the switching circuit 321 to an output terminal 322.

Using the fourth embodiment of the present invention, it is possible to reduce the degradation of the image because of using the two-dimensional correlation of the image, in other words using all of the surrounding blocks B, C, D, E of the unreliable block A.

If high speed processing is desired, it is possible to process more rapidly by arranging that the registers take in all the data surrounding the block A, shift them one by one, and consecutively output them.

It is described in the following how to modify the embodiments described by using FIG. 17, when continuous blocks are not decodable. Suppose, for example, that the horizontally continuous blocks A, E shown in FIG. 3 are not able to be decoded.

It is necessary to prepare the data of the lowest line of the block G, as the data x(N+1,1), x(N+2,1), ..., x(2N,1), in addition to the data x(1,1), x(2,1), ..., x(N,1). Further, it is necessary to prepare the data of the uppermost line of the block, H, as the data x(N+1,2), x(N+2,2), ..., x(2N,2), in addition to the data x(1,2), x(2,2), ..., x(N,2), and to prepare the data of the left most column of the block F instead of the data of the left most column of the block E, as the data y(1,2), y(2,2), ..., y(N,2). These data are read from the (N+2) lines memory 306 and are latched by the registers 311 to 314 as necessary under a control of the register control circuit 307.

The interpolated data S(nx,ny) are calculated according to the formula (5) in the situation mentioned above.

$$i\ S(nx,ny)=\{(N+1-nx)*x(ny,1)+nx*x(ny,2)\}/2(N+1)+\{(2N+1-ny)*y(nx,1)+ny*y(nx,2)\}/2(2N+1) \quad (5)$$

In the formula (5), nx is an integer in the range 1 to N, and ny is an integer in the range 1 to 2N. Therefore, necessary coefficients by which to multiply the data x(ny,1), x(ny,2), y(nx,1), y(nx,2), are (N+1-nx) /2(N+1),nx/2(N+1), (2N+1-ny)/2(2N+1), ny/2(2N+1),and are produced by the coefficient producing circuit 308.

Further, if it is supposed that the vertically continuous blocks A, C shown in FIG. 3 are not able to be decoded, it is necessary to prepare the data of the surrounding blocks B, J, D, I, E, H similarly to when the horizontally continuous blocks are not decodable. These data are named as x(1,1), x(2,1), ..., x(N,1), x(1,2), x(2,2), ..., x(N,2), y(1,1), y(2,1), ..., y(N,1), y(N+1,1), y(N+2,1), ..., y(2N,1), y(1,2), y(2,2), ..., y(N,2), y(N+1,2), y(N+2,2), ..., y(2N,2), and are latched by the registers 311 to 314.

The interpolative data S(nx,ny) are calculated according to the formula (6) in this situation.

$$S(nx,ny)=\{(2N+1-nx)*x(ny,1)+nx*x(ny,2)\}/2(2N+1)+\{N+1-ny)*y(nx,1)+ny*y(nx,2)\}/2(N+1) \quad (6)$$

In the formula (6), nx is an integer in the range 1 to 2N, and ny is an integer in the range 1 to N. Necessary coefficients by which to multiply the data x(ny,1), x(ny,2), y(nx,1), y(nx,2) are (2N+1-nx)/2(2N+1), nx/2(2N+1), (N+1-ny)/2(N+1),ny/2(N+1), and are produced by the coefficient producing circuit 308.

It is very straightforward for the person skilled in the art to apply the above-described idea of the fourth embodiment to the case that three or more continuous blocks are not able to be decoded.

Figure 1:
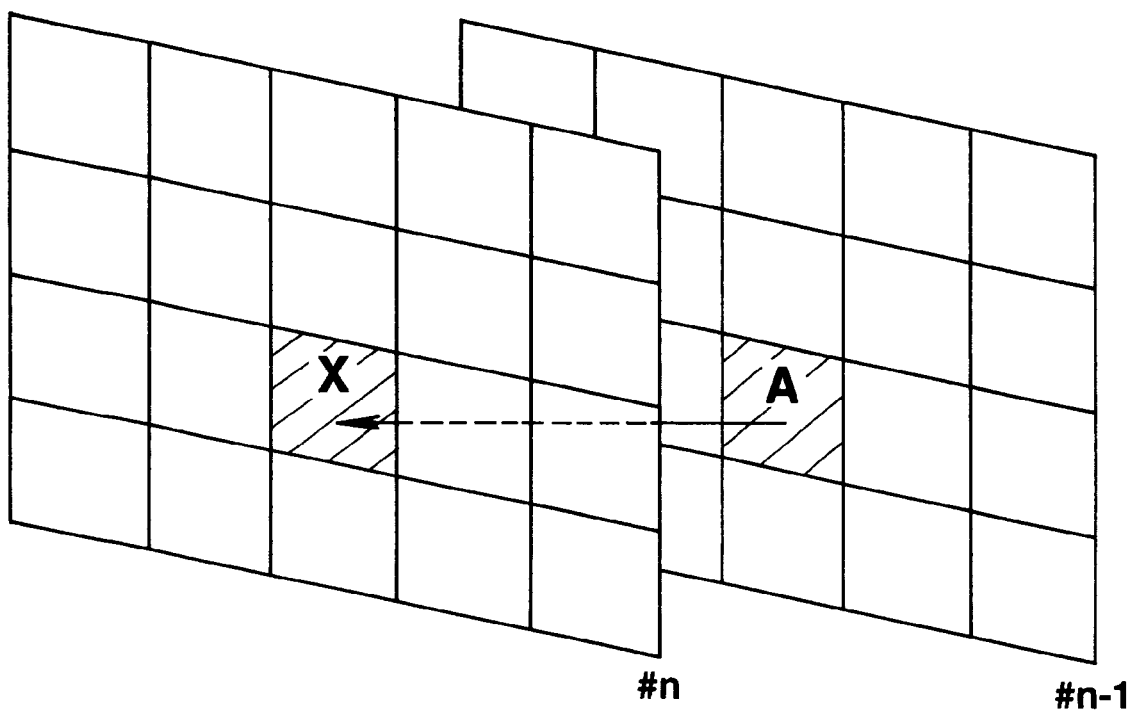
FIG. 1 shows a model for describing a conventional method to conceal an error block composed of a plurality of pixels.
Figure 19:
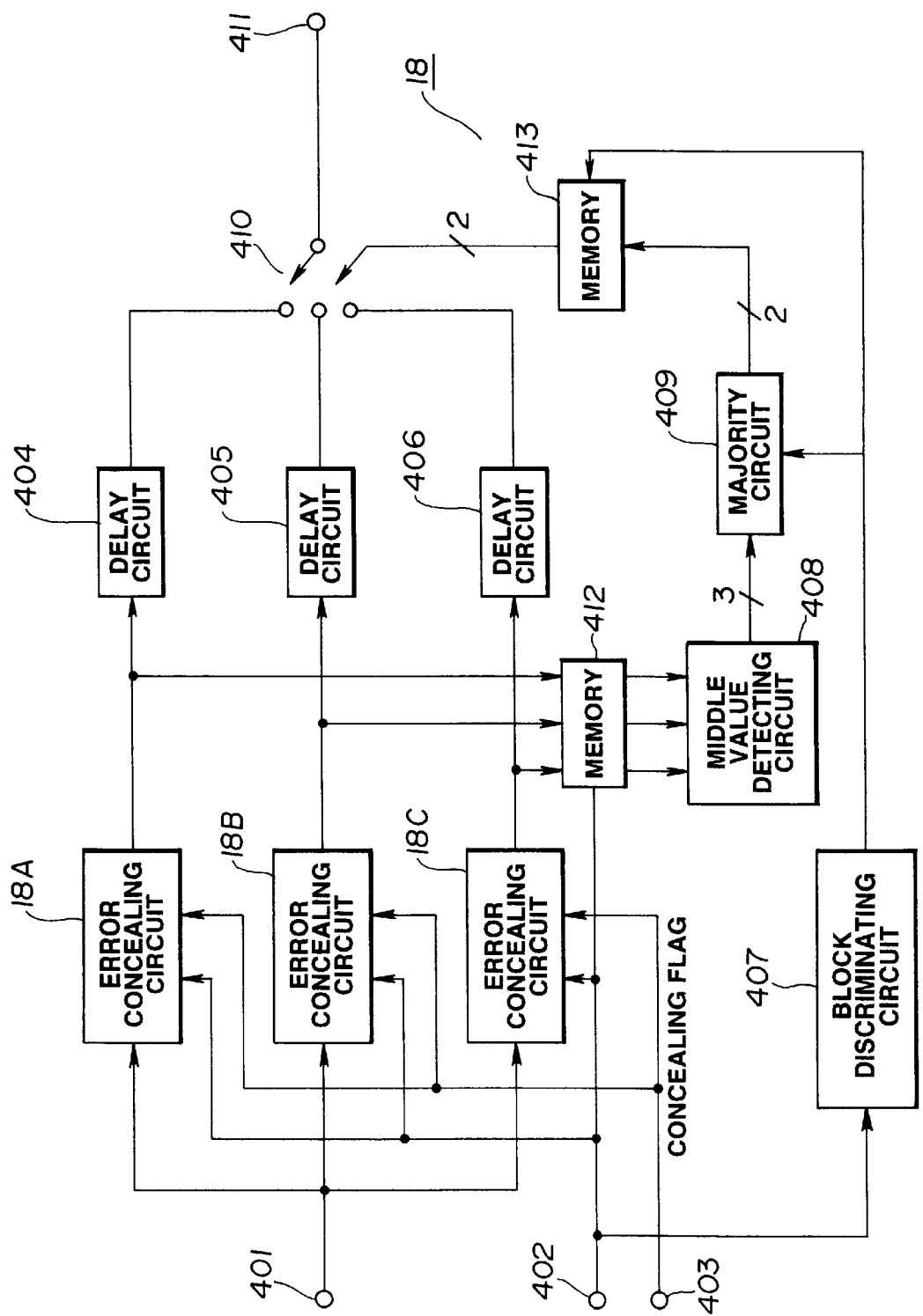
FIG. 19 is a block diagram of an error concealing circuit concerned with a fifth embodiment of the present invention.

FIG. 19 is a block diagram of the error concealing circuit according to a fifth embodiment of the present invention. Four embodiments have already been described for concealing the unreliable block. However, the determination of which method is suitable to prevent the degradation of the image depends upon the characteristics of the image. Also, it is possible that the conventional method described by using FIG. 1 is most effective for blocks positioned in a still image.

Therefore, many adaptive concealments, which adaptively change a concealing circuit or method between some circuits or methods, have already been proposed. However, most of them have a large amount of hardware because they have a motion detecting circuit.

One aspect of the fifth embodiment is to accomplish an adaptive error concealing circuit without using a motion detecting circuit.

In FIG. 19, an input terminal 401 receives the image data output from the reverse DCT circuit 15 shown in FIG. 2, an input terminal 402 receives timing signals generated by the timing control circuit 17 shown in FIG. 2, and an input terminal 403 receives the error concealing flag produced by the circuit 16 shown in FIG. 2.

The image data are supplied to three error concealing circuits 18A, 18B, 18C which are different from each other. It is possible that three of the particular concealing circuits described above are used as the circuits 18A, 18B, 18C. It is also possible that an error concealing circuit using inter-frame interpolation is used as one of the circuits 18A, 18B, 18C. In an example, the circuit shown in FIG. 5 is used as the circuit 18A, the circuit shown in FIG. 16 is used as the circuit 18B, and a circuit including inter-frame interpolation is used as the circuit 18C.

Each of the error concealing circuits outputs the image data which are rearranged according to the raster scanning and are composed of the reliable image data and the image data replacing the unreliable image data. The image data output from the circuits 18A, 18B, 18C are supplied to respective delay circuits 404, 405, 406 and a memory 412 in parallel. The memory 412 rearranges the order of the image data again such that each block of the image data is consecutively output therefrom.

A middle value detecting circuit 408 detects one of the image data having a middle value among the three image data for each pixel. The result of the detection is supplied to a majority circuit 409. The majority circuit 409 makes a decision which indicates which block has the most image data having the middle value, and outputs a deciding signal composed of two bits which indicates one of the error concealing circuits 18A, 18B, 18C for each block of the image data such that the one of the error concealing circuits which outputs the most image data of the middle value is used for each block.

The deciding signal is supplied to a memory 413 to be rearranged according to the raster scanning. The rearranged deciding signal output from the memory 413 controls a switching circuit 410. Accordingly, image data output from one of the delay circuits 404, 405, 406 is output from the switching circuit 410 to an output terminal 411 as the most suitable data. When three image data replacing the unreliable data are prepared, the data having a middle value makes an error concealment which is least messy.

The delay circuits 404, 405, 406 compensate for delays in the circuits 408, 409 and the memories 412, 413.

Figure 20:
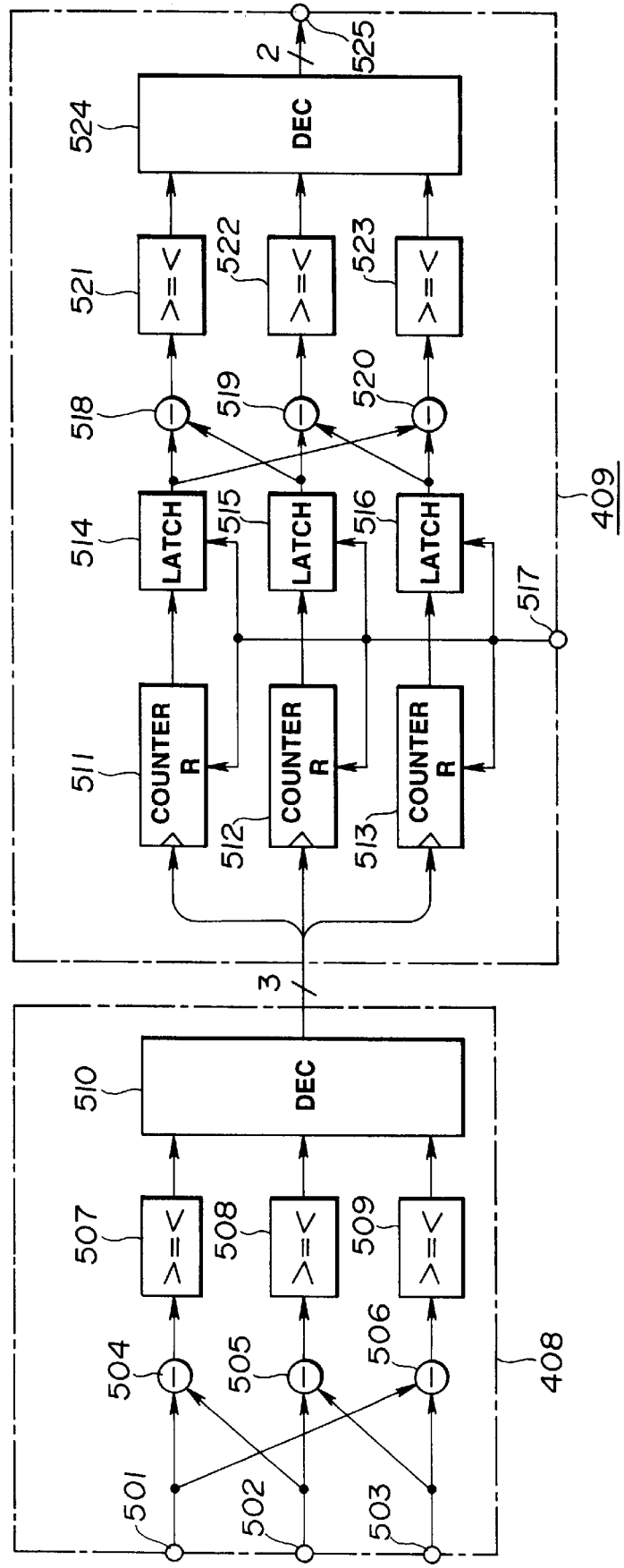
FIG. 20 is a block diagram which shows a middle value detection circuit and a majority circuit shown in FIG. 19 in detail.

FIG. 20 is a block diagram which shows one example of detailed circuits of the middle value detecting circuit 408 and the majority circuit 409 shown in FIG. 19.

In FIG. 20, three image data relating to the common pixel are simultaneously supplied to terminals 501, 502, 503. Each of subtracting circuits 504, 505, 506 makes a subtraction between two of the three image data received at input terminals 501, 502, 503. The output values of the subtracting circuits 504, 505, 506 are supplied to respective discriminating circuits 507, 508, 509.

The discriminating circuits 507, 508 and 509 discriminate that the output values of the subtracting circuits 504, 505 and 506, respectively, are zero, negative, or positive and output discriminating signals, each composed of two bits, which indicate the discrimination result. A decoder 510 receives three discriminating signals composed of six bits and is able to decide which data has a middle value between the -three image data received at the input terminals 501, 502, 503. The decoder 510 outputs a selection signal indicating one of the three image data which has the middle value, such that the selection signal is "1 0 0" when the image data input from the terminal 501 has the middle value, the selection signal is "0 1 0" when the image data input from the terminal 502 has the middle value, and the selection signal is "0 0 1" when the image data input from the terminal 503 has the middle value.

First, second, and third bits of the selection signal are supplied to respective counters 511, 512, 513 to be counted. These counters are reset by a pulse signal indicating boundaries of the block, and count the image data having a middle value in data sequences received at the respective input terminal 501, 502, 503 every period corresponding to one block.

Latch circuits 514, 515, 516 latch counted values of respective counters 511, 512, 513 and maintain the counted values for the period corresponding to one block. Each of three subtracting circuits 518, 519, 520 makes a subtraction between two of three values latched by the latch circuits 514, 515, 516. The output values of the subtracting circuits 514, 515, 516 are supplied to respective discriminating circuits 521, 522, 523.

The discriminating circuits 521, 522, 523 discriminate that the output values of the subtracting circuits 518, 519, 520 are zero, negative, or positive respectively, and output discriminating signals of two bits each which indicate the discrimination results. A decoder 524 receives these discriminating signals composed of six bits and outputs a selection signal indicating which has the largest value among the latched values. The selection signal is to be used for selecting the error concealing circuit.

In FIG. 20, each decoder 510, 524 can be composed of a look-up-table circuit consisting of a read-only-memory (ROM).

According to the construction shown in FIG. 20, the most suitable circuit for concealing each block is selected from among the three error concealing circuits 18A, 18B, 18C on the basis of output values thereof. Such a construction does not tend to increase an amount of hardware, because the construction does not need the motion detecting circuit. And, the circuit described with reference to FIG. 19 and FIG. 20 can output sufficiently good data for replacing the unreliable data.

Such an idea, that one of the data for concealing the unreliable data is selected depending on the values thereof, can be applied to an error concealing system which can replace each unreliable pixel in units of one pixel, as well as an error concealing system replacing each unreliable block in units of one block.

Figure 21:
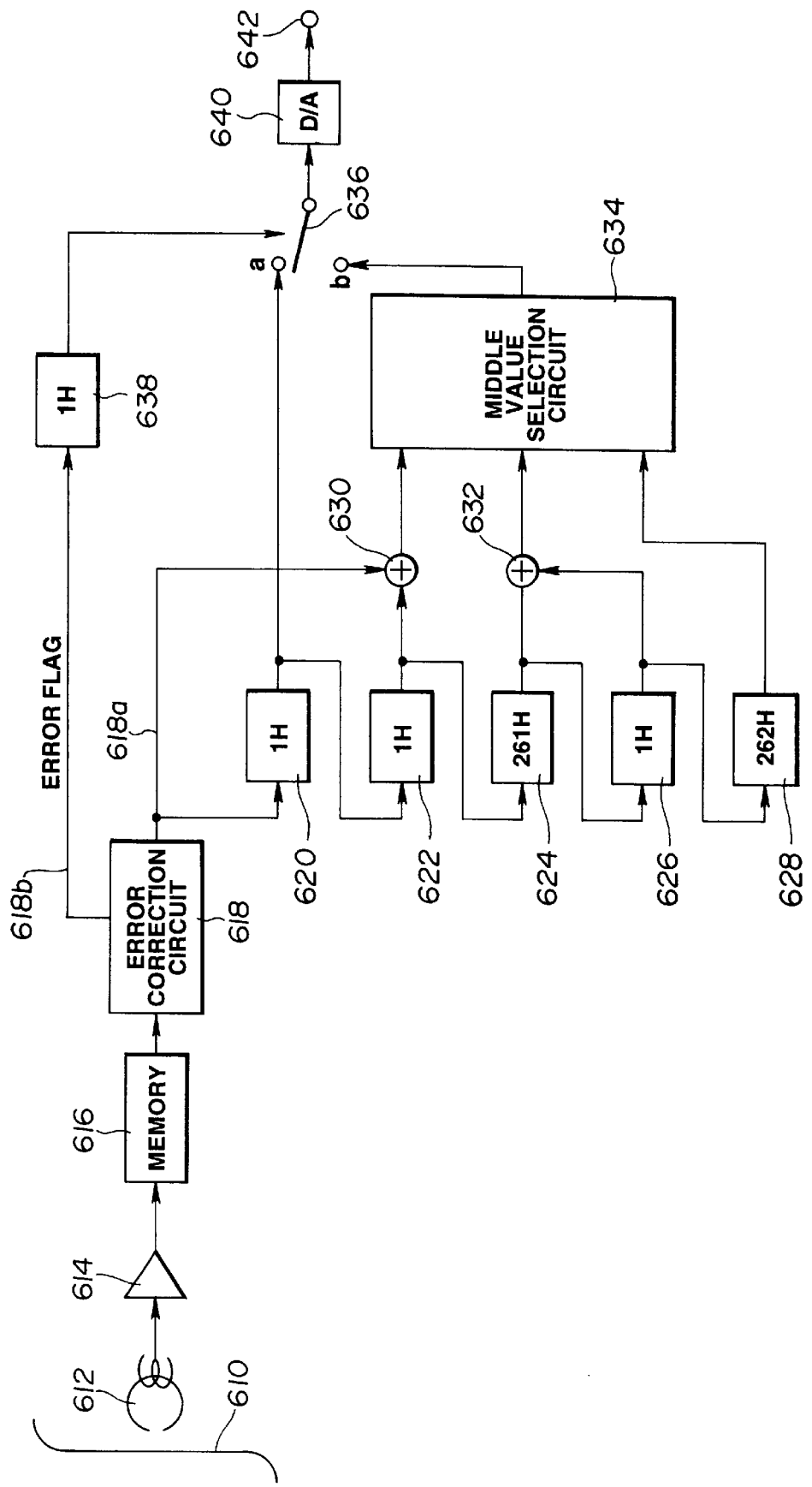
FIG. 21 is a block diagram which shows an image reproducing apparatus concerned with a sixth embodiment of the present invention.

FIG. 21 is a block diagram which shows a reproducing apparatus including an error concealing system according to the idea above-mentioned, as a sixth embodiment of the present invention.

In FIG. 21, a reproducing head 612 reproduces an image signal which is digitized, shuffled and modified to a signal form being suitable for a recording medium 610. A reproduced signal reproduced by the reproducing head 612 is supplied to a reproducing amplifier 614 and is amplified therein such that the image signal reaches a sufficient amplitude.

A memory 616 detects digitized image data from the signal output from the amplifier 614, and temporarily stores them. The memory 616 also operates for rearranging an order of the image data from the order shuffling the image data for recording to the order according to the raster scanning.

The image data output from the memory 616 are supplied to an error correction circuit 618. The error correction circuit 618 corrects code errors that have occurred in recording and reproducing processes on the basis of error correction (parity) codes which have been added to the image data before recording. The error correction circuit 618 supplies the image data 618a including codes corrected thereby to a delay circuit 620 and an adding circuit 630, and supplies an error flag 618b generated according to occurrences of uncorrectable code errors which are impossible to correct therein to a delay circuit 638.

Delay circuits 620, 622, 626 delay an image signal for one horizontal scanning period each, and delay circuits 624, 628 delay an image signal for 261 horizontal scanning periods and, 262 horizontal scanning periods, respectively. These delay circuits are serially connected in the order 620, 622, 624, 626, 628.

An adding circuit 630 adds the image data 618a output from the error correction circuit and the image data output from the delay circuit 622 and calculates a half of the added data. In short, the adding circuit 630 calculates an average value of them. An adding circuit 632 adds the image data output from the delay circuit 624 and the image data output from the delay circuit 626 and calculates a half of the added data as an average value of them.

Image data output from the adding circuit 630, image data output from the adding circuit 632 and image data output from the delay circuit 628 are supplied to a middle value selection circuit 634. When the image data output from the delay circuit 620 is supposed to be data of a subject pixel, the output data of the delay circuit 628, delayed for 525 horizontal scanning periods, corresponds to the pixel of a previous frame positioned the same as the subject pixel. Similarly, the output data of the adding circuit 630 corresponds to the average data of two pixels of previous and following lines in the same frame positioned at the same horizontal position as the subject pixel, and the output data of the adding circuit 632 corresponds to the average data of two pixels of adjacent upper and lower lines in the previous field positioned at the same horizontal position.

Figure 23:
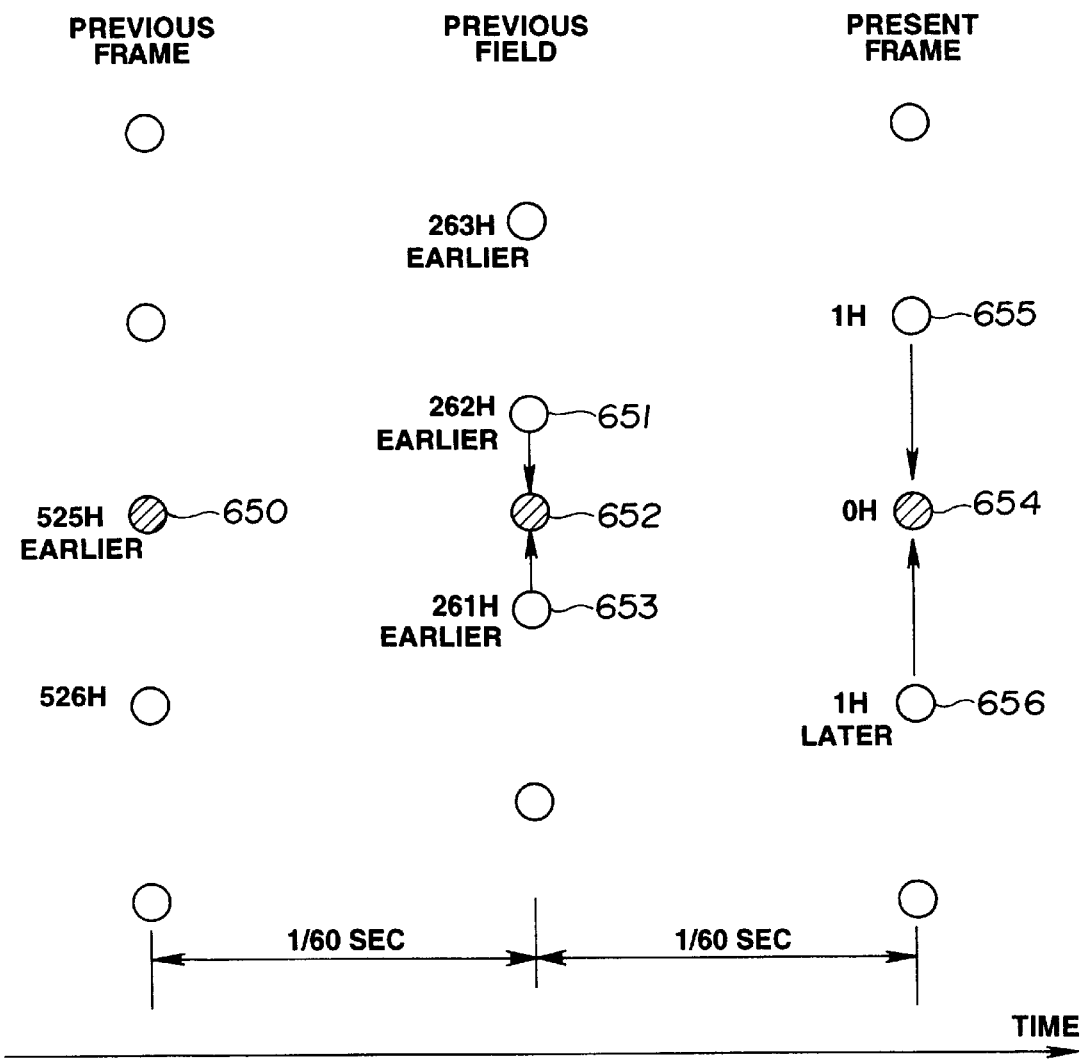
FIG. 23 shows a model of the pixels to be selectively used for concealing an error pixel in the circuit shown in FIG. 22.

FIG. 23 shows relationships among the subject pixel and three pixels corresponding to the data input to the middle value selection circuit 634. The output data of the delay circuit 628 corresponds to a pixel 650, the output data of the adding circuit 630 corresponds to an average value of pixels 655, 656, the output data of the adding circuit 632 corresponds to an average value 652 of pixels 651, 653 and the output data of the delay circuit 620 corresponds to the subject pixel 654 in FIG. 23.

The middle value selection circuits 634 outputs data which has a middle value among three data input thereto, and the data having the middle value are supplied to a terminal b of a switching circuit 636. A delay circuit 638 delays the error flag 618b for one horizontal scanning period to compensate a delay of the data of the subject pixel, and supplies the delayed error flag to a control terminal of the switching circuit 636 as a switching control signal.

The switching circuit 636 selectively outputs the output data of the delay circuit 620 as the present image data or the output data of the middle value selection circuit 634 as an interpolative data. In short, the switching circuit usually outputs the output data of the delay circuit 620, but outputs the output data of the middle value selection circuit 634 in place of data having an uncorrectable error.

The output data of the switching circuit 636 are supplied to a digital-to-analogue (D/A) converter 640, and are converted to an analogue image signal. The analogue image signal output from the D/A converter 640 is output to an output terminal 642.

Figure 22:
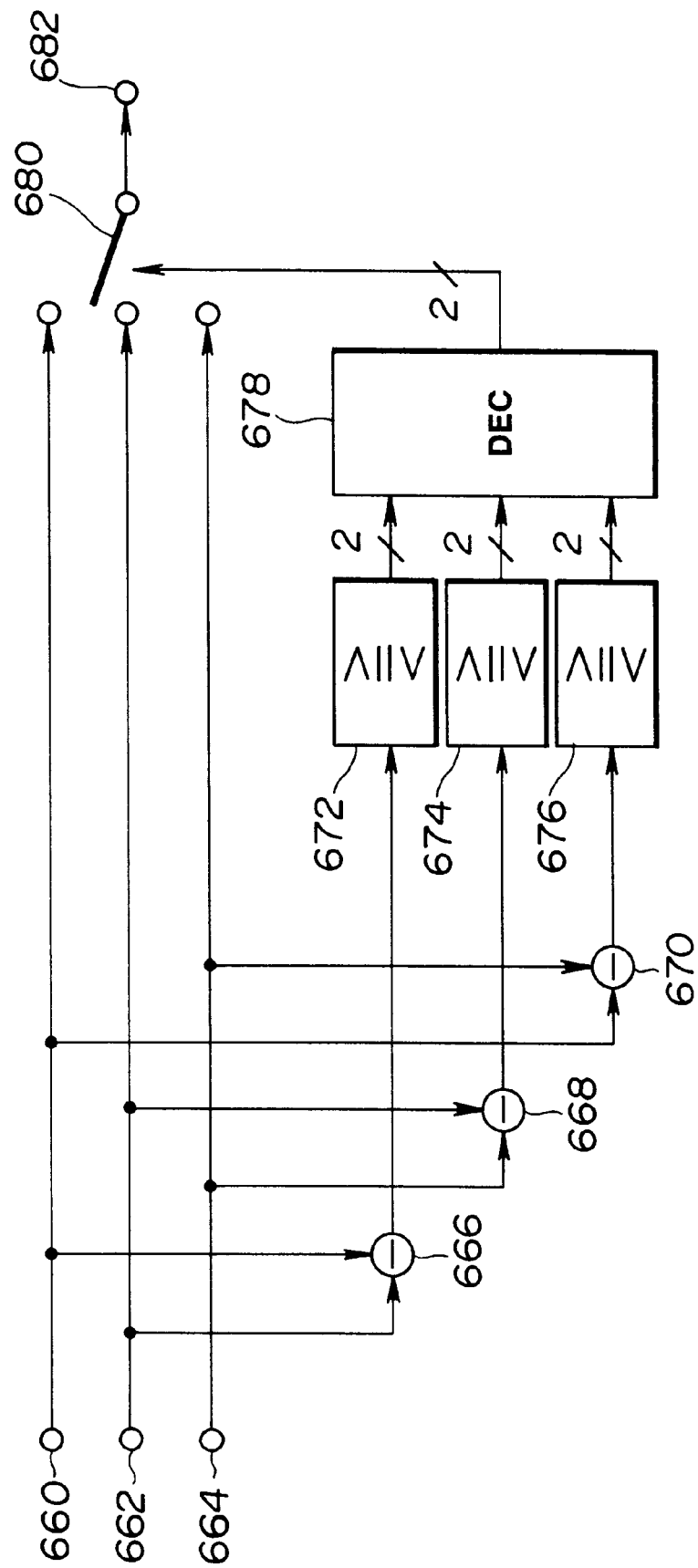
FIG. 22 is a block diagram which shows in detail a middle value selection circuit shown in FIG. 21.

FIG. 22 shows an example of an actual circuit of the middle value selection circuit 634. In FIG. 22, the output data of the adding circuit 630, the output data of the adding circuit 632, and the output circuit of the delay circuit 628 are input at in parallel terminals 660, 662 and 664 in, respectively.

Each of three subtracting circuits 666, 668, 670 makes a subtraction between two of the three image data received at from the terminals 660, 662, 664. The output values of the subtracting circuits 666, 668, 670 are supplied to respective discriminating circuits 672, 674, 676.

The discriminating circuits 672, 674, 676 discriminate whether the output values of the respective subtracting circuits 666, 668, 670 are zero, negative or positive, and output discriminating signals each which composed of two bits. A decoder 678 receives the three discriminating signals composed of six bits and outputs a selection signal composed of two bits to control a switching circuit 680. The switching circuit 680 outputs the one of the data input from the input terminals 660, 662, 664 which has a middle value among them, and supplies the data having the middle value to a terminal 682.

As mentioned above, when the idea that interpolative data are selected depending on values of a plurality of interpolative data is adopted, the amount of hardware required for the adaptive error concealing circuit is much decreased relative to the circuit using a motion detecting circuit.

It is easily understandable that the six embodiments described above are efficiently to solve the problems described in the summary of the invention. However, the present invention is not limited by the six embodiments, and the embodiments are able to be modified within the scope of the appended claims.

We claim:

1. An image signal reproducing apparatus comprising: receiving means for receiving a transmitted image signal transmitted through a transmitting path, the transmitted image signal comprising blocks each of which comprises pixel data corresponding to a predetermined number of pixels; and
error concealing means for concealing a subject block including a code error using only pixel data corresponding to a subset of the pixels from each designated block, each subset including fewer than all of the pixels from the respective designated block,
wherein there are at least two designated blocks and the designated blocks are adjacent to the subject block in the same frame, and wherein said error concealing means replaces pixel data corresponding to at least some pixels of the subject block by copying the pixel data corresponding to the subset of the pixels of the designated blocks.

2. An apparatus according to claim 1, wherein said error concealing means replaces all pixel data of the subject block with the pixel data corresponding to the subset of the pixels of the designated blocks.

3. An apparatus according to claim 1, wherein said error concealing means replaces pixel data corresponding to some pixels of the subject block with respective ones of the pixel data corresponding to the subset of the pixels of the designated blocks, and replaces codes corresponding to remaining pixels of the subject block with codes produced by a linear computation using the pixel data corresponding to the subset of the pixels of the designated blocks.

4. An apparatus according to claim 1, wherein the subset of the pixels is located closer to the subject block than remaining pixels in the respective designated blocks.

5. An apparatus according to claim 1, further comprising further concealing means for concealing the subject block and selection means for selectively using said error concealing means and said further error concealing means.

6. An apparatus according to claim 5, wherein said further concealing means conceals the subject block using pixel data corresponding to pixels in a previous frame.

7. An image signal reproducing apparatus according to claim 1,
wherein two of the designated blocks are respectively located at upper and lower sides of the subject block in the same frame, and wherein said error concealing means replaces pixel data corresponding to at least another part of the pixels of the subject block with pixel data produced by a computation using the pixel data corresponding to the subset of the pixels of the two designated blocks.

8. An apparatus according to claim 7, wherein the computation is a linear computation using pixel data of at least two pixels positioned on opposite sides of the subject block.

9. An apparatus according to claim 8, wherein the pixel data produced by the linear computation maintain only one-dimensional linearity with respect to pixel data of surrounding pixels.

10. An apparatus according to claim 8, wherein the pixel data produced by the linear computation maintain two-dimensional linearity with respect to pixel data of surrounding pixels.

11. An apparatus according to claim 2, wherein the subset of the pixels is, positioned closer to the subject block than remaining pixels in the adjacent respective blocks.

12. An apparatus according to claim 7, further comprising further concealing means for concealing the subject block and selection means for selectively using said error concealing means and said further concealing means.

13. An apparatus according to claim 12, wherein said further concealing means conceals the subject block using pixel data corresponding to pixels in a previous frame.

14. An image signal reproducing apparatus comprising: receiving means for receiving a transmitted image signal transmitted through a transmitting path, the transmitted image signal comprising blocks each of which comprises pixel data corresponding to a predetermined number of pixels;

error concealing means for concealing a subject block including a code error using only pixel data corresponding to a subset of the pixels from each designated block, each subset including fewer than all of the pixels from the respective designated block, wherein there are at least two designated blocks and the designated blocks are adjacent to the subject block in the same frame;

at least two further concealing means, each of which is for concealing the subject block; and selection means for selectively using said error concealing means and said at least two further concealing means based on pixel data produced by said error concealing means and said at least two further concealing means.

15. An apparatus according to claim 14, wherein said selection means selects one of said error concealing means and said at least two further concealing means for each block as a unit.

16. An apparatus according to claim 15, wherein said selection means compares pixel data produced by said error concealing means and said at least two further concealing means for replacing pixel data of the subject block for each pixel, detects pixel data having a predetermined ranking among the compared data, and decides which concealing means is to be used for the subject block by choosing the concealing means with the pixel data of the predetermined ranking for all pixels of the subject block.

17. An image signal reproducing apparatus, comprising:

(a) reproducing means for reproducing an image signal transmitted through a transmitting path, the image signal comprising blocks each of which comprises pixel data corresponding to (i×j) pixels two-dimensionally arranged, (i≧2, j>2); and (b) error concealing means for concealing a subject block including a code error, said error concealing means replacing pixel data corresponding to at least some pixels of the subject block by copying, without computation, pixel data corresponding to pixels of a block which is adjacent to the subject block in the same frame.

18. An apparatus according to claim 17 wherein said error concealing means replaces all pixel data of the subject block with pixel data from blocks adjacent to the subject block.

19. An apparatus according to claim 17, wherein said error concealing means replaces pixel data corresponding to some pixels of the subject block with codes from the adjacent block and replaces codes corresponding to remaining pixels of the subject block with codes produced by a computation using pixel data of the adjacent block.

20. An apparatus according to claim 17, wherein said error concealing means replaces pixel data of the subject block with pixel data corresponding respectively to pixels of at least two blocks adjacent to the subject block in the same frame.

21. An apparatus according to claim 17, further comprising further concealing means, for concealing the subject blocks and selection means for selectively using said error concealing means and said further concealing means.

22. An apparatus according to claim 21, wherein said further concealing means conceals the subject block using pixel data corresponding to pixels in a previous frame.

23. An image signal reproducing apparatus, comprising:

(a) reproducing means for reproducing an image signal transmitted through a transmitting path, the transmitted image signal comprising blocks each of which comprises pixel data corresponding to a predetermined number of pixels; and (b) error concealing means for concealing a subject block including a code error, said error concealing means replacing pixel data corresponding to at least some pixels of the subject block by copying, without computation, pixel data corresponding to a subset consisting of fewer than all pixels of a block which is adjacent to the subject block in the same frame.

24. An image signal reproducing apparatus, comprising:

(a) reproducing means for reproducing an image signal transmitted through a transmitting path, the image signal comprising blocks each of which comprises pixel data corresponding to (i×j) number of pixels, i and j being integers each of which is at least two; and (b) error concealing means for concealing a subject block including a code error using pixel data of four blocks which are adjacent to the subject block in all directions in the same frame, the subject block together with the four blocks constituting fewer than all pixels in the frame.

25. An image signal reproducing apparatus according to claim 24, wherein only a subset of pixel data from each of the four adjacent blocks is used for concealing the subject block.

26. An apparatus according to claim 25, wherein said error concealing means replaces the pixel data of the subject block with pixel data produced by a computation using the subsets of the pixel data of the four adjacent blocks, and the computation maintains two-dimensional linearity with respect to the pixels data of surrounding pixels.

27. An image signal reproducing apparatus, comprising:

(a) reproducing means for reproducing an image signal transmitted through a transmitting path;

(b) a plurality of error concealing means each of which is able to produce concealing pixel data to replace erroneous pixel data occurring in the image signal; and (c) selection means for selecting one of the concealing means to be used for concealing a given pixel by comparing values of the concealing pixel data.

28. An apparatus according to claim 27, wherein said selection means selects pixel data having a predetermined ranking among the concealing pixel data for concealing the same pixel.

29. An apparatus according to claim 28, wherein said selection means selects pixel data having a middle ranking among the concealing pixel data for concealing a given pixel.

30. An apparatus according to claim 27, wherein the image signal comprises blocks, each comprising pixel data corresponding to a predetermined number of pixels, and said selection means selects one of a plurality of concealing blocks, produced by said plurality of error concealing means to be used for concealing a block including an erroneous code.

31. An apparatus according to claim 30, wherein said selection means detects pixel data having a predetermined ranking among the concealing pixel data for each given pixel and selects the one of the concealing blocks which has the most pixel data of the predetermined ranking, over all pixels of the block to be replaced.

32. An apparatus according to claim 27, wherein one of said plurality of error concealing means produces the concealing pixel data using only pixel data being in the same frame as the pixel data to be replaced, and another of said plurality of error concealing means produces the concealing pixel data using pixel data from a previous frame.

* * * * *

UNITED STATES PATENT AND TRADEMARK OFFICE
CERTIFICATE OF CORRECTION

PATENT NO.   : 6,052,159
DATED        : April 18, 2000
INVENTOR(S)  : Yoshiki Ishii et al.

It is certified that error appears in the above-identified patent and that said Letters Patent is hereby corrected as shown below:

Column 1,
Line 15, "the" should read -- the signal --.

Column 3,
Line 20, "constitute; and" should read -- constitute --; and
Line 33, "is" should be deleted.

Column 4,
Line 53, "circuit." should read -- circuit --; and
Line 62, "etc," should read -- etc. --.

Column 5,
Line 52, "#1-#5" should read -- #1 - #5 --.

Column 6,
Line 3, "such" should read -- in such --; and
Line 66, "which" should read -- which are --.

Column 7,
Line 52, "#1-#5" should read -- #1 - #5 --.

Column 10,
Line 46, "of" should read -- on --.

Column 12,
Line 1, "will" should read -- will be -- ; and
Line 56, "carried" should read -- carries --.

UNITED STATES PATENT AND TRADEMARK OFFICE
CERTIFICATE OF CORRECTION

PATENT NO. : 6,052,159
DATED : April 18, 2000
INVENTOR(S) : Yoshiki Ishii et al.

It is certified that error appears in the above-identified patent and that said Letters Patent is hereby corrected as shown below:

Column 13,
Line 57, "ny/2 (2N+1), and" should read -- ny/2 (2N+1), and --.

Column 15,
Line 28, "-three" should read -- three --.

Column 16,
Line 13, "above-mentioned," should read -- mentioned above, --.

Column 17,
Line 9, "circuits" should read -- circuit --;
Line 31, "664 in," should read -- 664, --;
Line 51, "much" should read -- greatly --; and
Line 54, "are" should be deleted.

Column 18,
Line 52, "claim 2," should read -- claim 7, --; and
Line 54, "adjacent respective" should read -- respective designated --.

Column 19,
Line 56, "blocks" should read -- block, --.

Signed and Sealed this

Fourth Day of December, 2001

Attest:

NICHOLAS P. GODICI
Attesting Officer
Acting Director of the United States Patent and Trademark Office